United States Patent
Talbot et al.

(10) Patent No.: US 9,531,609 B2
(45) Date of Patent: Dec. 27, 2016

(54) VIRTUAL SERVICE AUTOMATION

(71) Applicant: CA, Inc., Islandia, NY (US)

(72) Inventors: Nicholas William Talbot, Manassas Park, VA (US); Kenneth Norman Ahrens, Marietta, GA (US)

(73) Assignee: CA, Inc., Islandia, NY (US)

( * ) Notice: Subject to any disclaimer, the term of this patent is extended or adjusted under 35 U.S.C. 154(b) by 172 days.

(21) Appl. No.: 14/222,661

(22) Filed: Mar. 23, 2014

(65) Prior Publication Data

US 2016/0197803 A1  Jul. 7, 2016

(51) Int. Cl.
  G06F 15/173  (2006.01)
  H04L 12/26  (2006.01)
  G06F 9/44  (2006.01)

(52) U.S. Cl.
  CPC .............. *H04L 43/08* (2013.01); *G06F 8/00* (2013.01)

(58) Field of Classification Search
  CPC ........... H04L 12/2455; H04L 29/08945; H04L 67/1002
  USPC ................................. 709/224, 220, 200, 226
  See application file for complete search history.

(56) References Cited

U.S. PATENT DOCUMENTS

| | | |
|---|---|---|
| 5,450,586 A | 9/1995 | Kuzara et al. |
| 5,485,618 A | 1/1996 | Smith |
| 5,576,965 A | 11/1996 | Akasaka et al. |
| 5,581,696 A | 12/1996 | Kolawa et al. |
| 5,642,511 A | 6/1997 | Chow |
| 5,798,757 A | 8/1998 | Smith |
| 5,867,707 A | 2/1999 | Nishida et al. |
| 5,956,479 A | 9/1999 | McInerney et al. |
| 5,958,008 A | 9/1999 | Pogrebisky et al. |
| 5,999,988 A | 12/1999 | Pelegri-Llopart et al. |
| 6,002,871 A | 12/1999 | Duggan et al. |
| 6,038,395 A | 3/2000 | Chow |
| 6,061,721 A | 5/2000 | Ismael et al. |
| 6,122,627 A | 9/2000 | Carey et al. |
| 6,134,540 A | 10/2000 | Carey et al. |

(Continued)

FOREIGN PATENT DOCUMENTS

EP  869433  10/1998

OTHER PUBLICATIONS

Wikipedia, "Mock Object," Sep. 23, 2008, printed May 31, 2009, http://en.wikipedia.org/wiki/Mock_object, pp. 1-5.

(Continued)

*Primary Examiner* — El Hadji Sall
(74) *Attorney, Agent, or Firm* — Patent Capital Group

(57) ABSTRACT

A data source is identified that includes transaction data describing a set of transactions involving a particular software component and each transaction in the set of transactions includes a request and a corresponding response to the request. In some aspects, a modification to the data source is detected and the service model is caused to be generated based on detecting the modification. The service model is to model responses of the particular software component to requests in transactions based at least in part on the transaction data. A virtual service is caused to be generated based on the service model. The resulting virtual service can be configured to receive requests and generate virtual responses to the requests based on the service model to simulate responses of the particular software component.

19 Claims, 11 Drawing Sheets

(56) References Cited

U.S. PATENT DOCUMENTS

| | | |
|---|---|---|
| 6,134,581 A | 10/2000 | Ismael et al. |
| 6,144,962 A | 11/2000 | Weinberg et al. |
| 6,189,138 B1 | 2/2001 | Fowlow et al. |
| 6,230,309 B1 | 5/2001 | Turner et al. |
| 6,249,882 B1 | 6/2001 | Testardi |
| 6,353,840 B2 | 3/2002 | Saito et al. |
| 6,408,430 B2 | 6/2002 | Gunter et al. |
| 6,427,230 B1 | 7/2002 | Goiffon et al. |
| 6,463,578 B1 | 10/2002 | Johnson |
| 6,473,707 B1 | 10/2002 | Grey |
| 6,490,719 B1 | 12/2002 | Thomas |
| 6,557,011 B1 | 4/2003 | Sevitsky et al. |
| 6,558,431 B1 | 5/2003 | Lynch et al. |
| 6,587,969 B1 | 7/2003 | Weinberg et al. |
| 6,601,018 B1 | 7/2003 | Logan |
| 6,601,020 B1 | 7/2003 | Myers |
| 6,637,020 B1 | 10/2003 | Hammond |
| 6,662,188 B1 | 12/2003 | Rasmussen et al. |
| 6,668,371 B2 | 12/2003 | Hamilton et al. |
| 6,684,387 B1 | 1/2004 | Acker et al. |
| 6,785,882 B1 | 8/2004 | Goiffon et al. |
| 6,792,426 B2 | 9/2004 | Baumeister et al. |
| 6,810,368 B1 | 10/2004 | Pednault |
| 6,826,716 B2 | 11/2004 | Mason |
| 6,851,118 B1 | 2/2005 | Ismael et al. |
| 6,879,946 B2 | 4/2005 | Rong et al. |
| 6,883,162 B2 | 4/2005 | Jackson et al. |
| 6,895,578 B1 | 5/2005 | Kolawa et al. |
| 6,912,520 B2 | 6/2005 | Hankin et al. |
| 6,920,609 B1 | 7/2005 | Manber et al. |
| 6,941,298 B2 | 9/2005 | Chow et al. |
| 6,957,199 B1 | 10/2005 | Fisher |
| 7,055,137 B2 | 5/2006 | Mathews |
| 7,065,745 B2 | 6/2006 | Chan |
| 7,080,303 B2 | 7/2006 | Bowers |
| 7,149,734 B2 | 12/2006 | Carlson et al. |
| 7,174,536 B1 | 2/2007 | Kothari et al. |
| 7,240,328 B2 | 7/2007 | Beckett et al. |
| 7,310,777 B2 | 12/2007 | Cirne |
| 7,340,481 B1 | 3/2008 | Baer et al. |
| 7,340,725 B1 | 3/2008 | Robinson et al. |
| 7,343,587 B2 | 3/2008 | Moulden et al. |
| 7,350,191 B1 | 3/2008 | Kompella et al. |
| 7,376,549 B2 | 5/2008 | Horikawa |
| 7,392,506 B2 | 6/2008 | Garcowski et al. |
| 7,392,507 B2 | 6/2008 | Kolawa et al. |
| 7,401,141 B2 | 7/2008 | Carusi et al. |
| 7,437,710 B2 | 10/2008 | Bau et al. |
| 7,487,508 B2 | 2/2009 | Fu et al. |
| 7,512,840 B2 | 3/2009 | Martin et al. |
| 7,539,980 B1 | 5/2009 | Bailey et al. |
| 7,552,036 B2 | 6/2009 | Oslake et al. |
| 7,562,255 B2 | 7/2009 | El Far et al. |
| 7,676,538 B2 | 3/2010 | Potter et al. |
| 7,694,181 B2 | 4/2010 | Noller et al. |
| 7,721,265 B1 | 5/2010 | Xu et al. |
| 7,783,613 B2 | 8/2010 | Gupta et al. |
| 7,784,045 B2 | 8/2010 | Bowers |
| 7,805,496 B2 | 9/2010 | Aiber et al. |
| 7,827,527 B1 | 11/2010 | Chiluvuri |
| 7,873,594 B2 | 1/2011 | Harada et al. |
| 7,913,230 B2 | 3/2011 | Vikutan |
| 7,966,193 B2 | 6/2011 | Kryskow et al. |
| 8,028,272 B2 | 9/2011 | Eldridge et al. |
| 8,060,864 B1 | 11/2011 | Michelsen |
| 8,112,262 B1 | 2/2012 | Michelsen |
| 8,117,591 B1 | 2/2012 | Michelsen |
| 8,146,057 B1 | 3/2012 | Michelsen |
| 8,392,884 B2 | 3/2013 | Specchio et al. |
| 8,538,740 B2 | 9/2013 | Kumar et al. |
| 8,543,379 B1 | 9/2013 | Michelsen |
| 8,826,230 B1 | 9/2014 | Michelsen |
| 8,898,681 B1 | 11/2014 | Acheff et al. |
| 9,111,019 B2 | 8/2015 | Michelsen et al. |
| 9,128,694 B1 | 9/2015 | Michelsen |
| 9,323,645 B2 | 4/2016 | Michelsen |
| 9,378,118 B2 | 6/2016 | Michelsen |
| 9,417,990 B2 | 8/2016 | Michelsen |
| 2002/0010781 A1 | 1/2002 | Tuatini |
| 2002/0095291 A1 | 7/2002 | Sumner |
| 2003/0009433 A1 | 1/2003 | Murren et al. |
| 2003/0014216 A1 | 1/2003 | Lebow |
| 2003/0046663 A1 | 3/2003 | Rogers et al. |
| 2003/0051194 A1 | 3/2003 | Cabezas et al. |
| 2003/0055670 A1 | 3/2003 | Kryskow et al. |
| 2003/0078949 A1 | 4/2003 | Scholz et al. |
| 2003/0081003 A1 | 5/2003 | Kutay et al. |
| 2003/0163608 A1 | 8/2003 | Tiwary et al. |
| 2003/0217162 A1 | 11/2003 | Fu et al. |
| 2004/0039993 A1 | 2/2004 | Kougiouris et al. |
| 2004/0068560 A1 | 4/2004 | Oulu et al. |
| 2004/0078782 A1 | 4/2004 | Clement et al. |
| 2004/0123272 A1 | 6/2004 | Bailey et al. |
| 2004/0128259 A1 | 7/2004 | Blakeley et al. |
| 2004/0162778 A1 | 8/2004 | Kramer et al. |
| 2004/0194064 A1 | 9/2004 | Ranjan et al. |
| 2004/0225919 A1 | 11/2004 | Reissman et al. |
| 2004/0230674 A1 | 11/2004 | Pourheidari et al. |
| 2004/0237066 A1 | 11/2004 | Grundy et al. |
| 2005/0027648 A1 | 2/2005 | Knowles et al. |
| 2005/0063335 A1 | 3/2005 | Shenfield et al. |
| 2005/0097515 A1 | 5/2005 | Ribling |
| 2005/0223365 A1 | 10/2005 | Smith et al. |
| 2005/0289231 A1 | 12/2005 | Harada et al. |
| 2006/0048100 A1 | 3/2006 | Levy et al. |
| 2006/0059169 A1 | 3/2006 | Armishev |
| 2006/0129992 A1 | 6/2006 | Oberholtzer et al. |
| 2006/0206870 A1 | 9/2006 | Moulden et al. |
| 2006/0224375 A1 | 10/2006 | Barnett et al. |
| 2006/0235675 A1 | 10/2006 | Oslake et al. |
| 2006/0265475 A9 | 11/2006 | Mayberry et al. |
| 2007/0006177 A1 | 1/2007 | Aiber et al. |
| 2007/0073682 A1 | 3/2007 | Adar et al. |
| 2007/0169003 A1 | 7/2007 | Branda et al. |
| 2007/0261035 A1 | 11/2007 | Duneau |
| 2007/0277158 A1 | 11/2007 | Li et al. |
| 2008/0010074 A1 | 1/2008 | Brunswig et al. |
| 2008/0120129 A1 | 5/2008 | Seubert et al. |
| 2008/0127093 A1 | 5/2008 | Fernandez-Ivern et al. |
| 2009/0064149 A1 | 3/2009 | Singh et al. |
| 2009/0094684 A1 | 4/2009 | Chinnusamy et al. |
| 2009/0119301 A1 | 5/2009 | Cherkasova et al. |
| 2009/0187534 A1 | 7/2009 | Broll et al. |
| 2009/0234710 A1 | 9/2009 | Hassine et al. |
| 2009/0282403 A1 | 11/2009 | Poole et al. |
| 2009/0298458 A1 | 12/2009 | Bakker et al. |
| 2010/0318974 A1 | 12/2010 | Hrastnik et al. |
| 2012/0059868 A1 | 3/2012 | Buckl et al. |
| 2014/0223418 A1 | 8/2014 | Michelsen et al. |
| 2015/0205699 A1 | 7/2015 | Michelsen |
| 2015/0205700 A1 | 7/2015 | Michelsen |
| 2015/0205701 A1 | 7/2015 | Michelsen |
| 2015/0205702 A1 | 7/2015 | Michelsen |
| 2015/0205703 A1 | 7/2015 | Michelsen |
| 2015/0205704 A1 | 7/2015 | Michelsen |
| 2015/0205706 A1 | 7/2015 | Michelsen |
| 2015/0205708 A1 | 7/2015 | Michelsen |
| 2015/0205709 A1 | 7/2015 | Michelsen et al. |
| 2015/0205712 A1 | 7/2015 | Michelsen |
| 2015/0205713 A1 | 7/2015 | Michelsen |
| 2015/0234731 A1* | 8/2015 | Williams ............ G06F 11/3684 717/126 |
| 2015/0286560 A1 | 10/2015 | Michelsen |
| 2016/0140023 A1 | 5/2016 | Michelsen |

OTHER PUBLICATIONS

Lisa, 2.0 User's Guide, Interactive TKO, Feb. 27, 2003, pp. 1-130.
Lisa, 2.0 Developer's Guide, Interactive TKO, Mar. 13, 2003, pp. 1-23.
Chapter 5—Service Discovery, Bluetooth Application Developer's Guide, 2002 (pp. 167-209).

(56) References Cited

OTHER PUBLICATIONS

Chatterjee, S., "Messaging Patterns in Service-Oriented Architecture, Part 1," msdn.microsoft.com/en-us/library/aa480027.aspx, Apr. 2004, (pp. 1-21).

Time to live—Wikipedia, the free encyclopedia; 2015; pp. 1-3. http://en.wikipedia.org/wikiiTime_to_live>, examiner annotated document.

Web Discussion: "Is TCP protocol stateless or not?" available online at "http://stackoverflow.com/questions/19899236/is-tcp-protocol-statelessor-not" pp. 1-3 (2013).

Oasis, "ebXML Test Framework Draft Document—Version 0.91," Dec. 2002, The Organization for the Advancement of Structured Information Standards, 92 pages.

Microsoft® Office, "FrontPage 2003 Product Guide," ©2003 Microsoft Corporation.

Robillard, M., "Representing Concerns in Source Code," available online at <http://www.cs.ubc.ca/grads/resources/thesis/May04/Martin_Robillard.pdf> Nov. 2003 (139 pages).

Sagar, "Reflection & Introspection: Objects Exposed," Java developers' Journal, May 1, 1998, (pp. 1-16).

Doucet, et al., "Introspection in System-Level Language Frameworks: Meta-Level vs. Integrated," available online at <http://delivery.acm.org/10.1145/1030000/1022756/187010382.pdf>. Mar. 2003 (pp. 1-6).

Beltrame et al., "Exploiting TLM and Object Introspection for System-Level Simulation," available online at <http://delivery.acm.org/10.1145/1140000/1131515/p100-beltrame.pdf>, Mar. 2006 (pp. 100-105).

Wright, et al., "Introspection of Java™ Virtual Machine Under Simulation," available online at <http://delivery.acm.org/10.1145/1700000/1698148/smli_tr-2006-159.pdf>. Jan. 2006 (pp. 1-26).

Andrews et al., "Tool Support for Randomized Unit Testing," available online at URL <http://delivery.acm.org/10.1145/1150000/1145741/p36-andrews.pdf>, Jul. 2006 (pp. 36-45).

Saff et al., "Automatic Test Factoring for Java," available online at URL <http://delivery.acm.org/10.1145/1110000/1101927/p114-saff.pdf>, Nov. 2002 (pp. 114-123).

Liu, Chang, "Platform-Independent and Tool-Neutral Test Descriptions for Automated Software Testing," ISCE 2000 available online at URL: <http://delivery.acm.org/10.1145/340000/337598/p713-liu.pdf>, (Pub Date 2000) (3 pages).

Yang et al., "Perracotta: Mining Temporal API Rules from Imperfect Traces", ICSE'06 May 20-28, 2006, Shanghai, China (Copyright 2006) 10 pages.

* cited by examiner

FIG. 3

| | | | SERVICE MODEL 300 |
|---|---|---|---|
| TRANSACTION 301(A) | COMMAND 311 | OBSERVED ATTRIBUTE(S) 321(1) | OBSERVED CHARACTERISTIC(S) 331(1) | OBSERVED RESPONSE 341(1) |
| TRANSACTION 301(B) | COMMAND 311 | OBSERVED ATTRIBUTE(S) 321(2) | OBSERVED CHARACTERISTIC(S) 331(2) | OBSERVED RESPONSE 341(2) |
| TRANSACTION 301(n+1) | COMMAND 311 | UNKNOWN ATTRIBUTE(S) 321(n+1) | DEFAULT CHARACTERISTIC(S) 331(n+1) | DEFAULT RESPONSE 341(n+1) |
| TRANSACTION 302(A) | COMMAND 312 | OBSERVED ATTRIBUTE(S) 322(1) | OBSERVED CHARACTERISTIC(S) 332(1) | OBSERVED RESPONSE 342(1) |
| TRANSACTION 302(B) | COMMAND 312 | USER-SPECIFIED ATTRIBUTE(S) 322(2) | USER-SPECIFIED CHARACTERISTIC(S) 332(2) | USER-SPECIFIED RESPONSE 342(2) |
| TRANSACTION 302(m+1) | COMMAND 312 | UNKNOWN ATTRIBUTE(S) 322(m+1) | DEFAULT CHARACTERISTIC(S) 332(m+1) | DEFAULT RESPONSE 342(m+1) |
| TRANSACTION 303 | UNKNOWN COMMAND 313 | UNKNOWN ATTRIBUTE(S) 323 | DEFAULT CHARACTERISTIC(S) 333 | DEFAULT RESPONSE 343 |

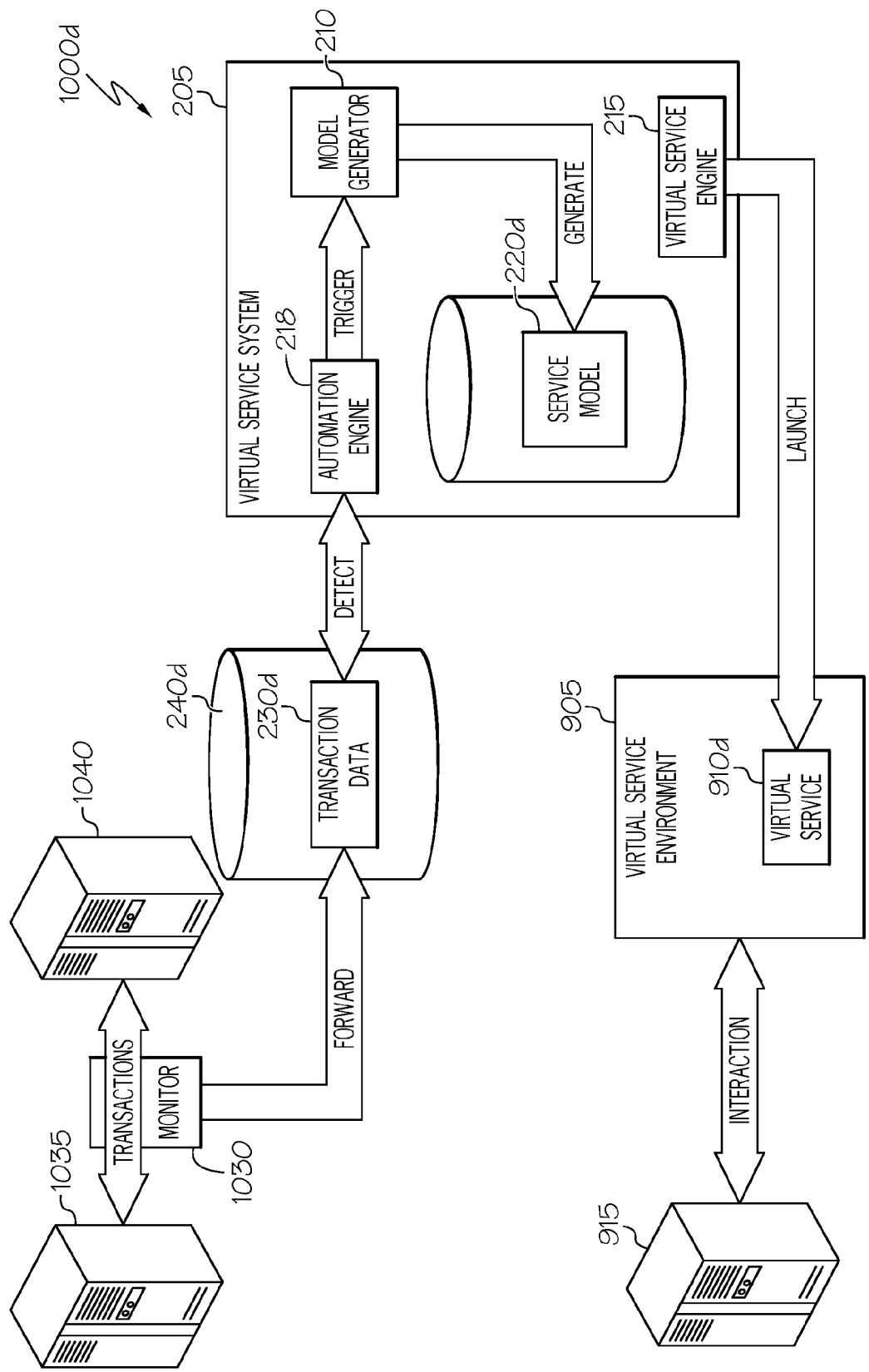

VIRTUAL SERVICE AUTOMATION

BACKGROUND

The present disclosure relates in general to the field of computer development, and more specifically, to software development involving coordination of mutually-dependent constrained systems.

Modern software systems often include multiple programs or applications working together to accomplish a task or deliver a result. For instance, a first program can provide a front end with graphical user interfaces with which a user is to interact. The first program can consume services of a second program, including resources of one or more databases, or other programs or data structures. In some cases, multiple interoperating computer programs and resources can be controlled or developed by a single entity, such as a single enterprise, publisher, or developer. In other instances, interoperating programs and resources can be developed and controlled by different parties. In some cases, access to a system component can be constrained in connection with the testing or development of the program (or its constituent components) that are to interoperate with the other components, for instance, when the component is a live production database and cannot be conveniently brought offline, is owned or controlled by a third party, or is, itself, under development.

BRIEF SUMMARY

According to one aspect of the present disclosure, a data source can be identified associated with a service model to be generated at least in part from transaction data deposited in the data source. The transaction data can describes a set of transactions involving a particular software component and each transaction in the set of transactions can include a request and a corresponding response to the request. Generation of the service model and corresponding virtual service can be automated. In some aspects, a modification to the data source can be detected and the service model can be generated based on detecting the modification. The service model can model responses of the particular software component to requests in transactions based at least in part on the transaction data. A virtual service can be generated based on the service model. The resulting virtual service can be configured to receive requests and generate virtual responses to the requests based on the service model to simulate responses of the particular software component. In other aspects, attributes of the service model and/or virtual service used to configure and generate the service model and/or virtual service can be identified from the transaction data and used in the automation, among other examples such as described and shown herein.

BRIEF DESCRIPTION OF THE DRAWINGS

FIG. 3 is a simplified block diagram illustrating an example service model in accordance with at least one embodiment;

FIGS. 10A-10D are simplified block diagrams showing example implementations of an automatic generation and deployment of a virtual service by an example virtual service system in accordance with at least some embodiments;

Like reference numbers and designations in the various drawings indicate like elements.

DETAILED DESCRIPTION

Figure 1:
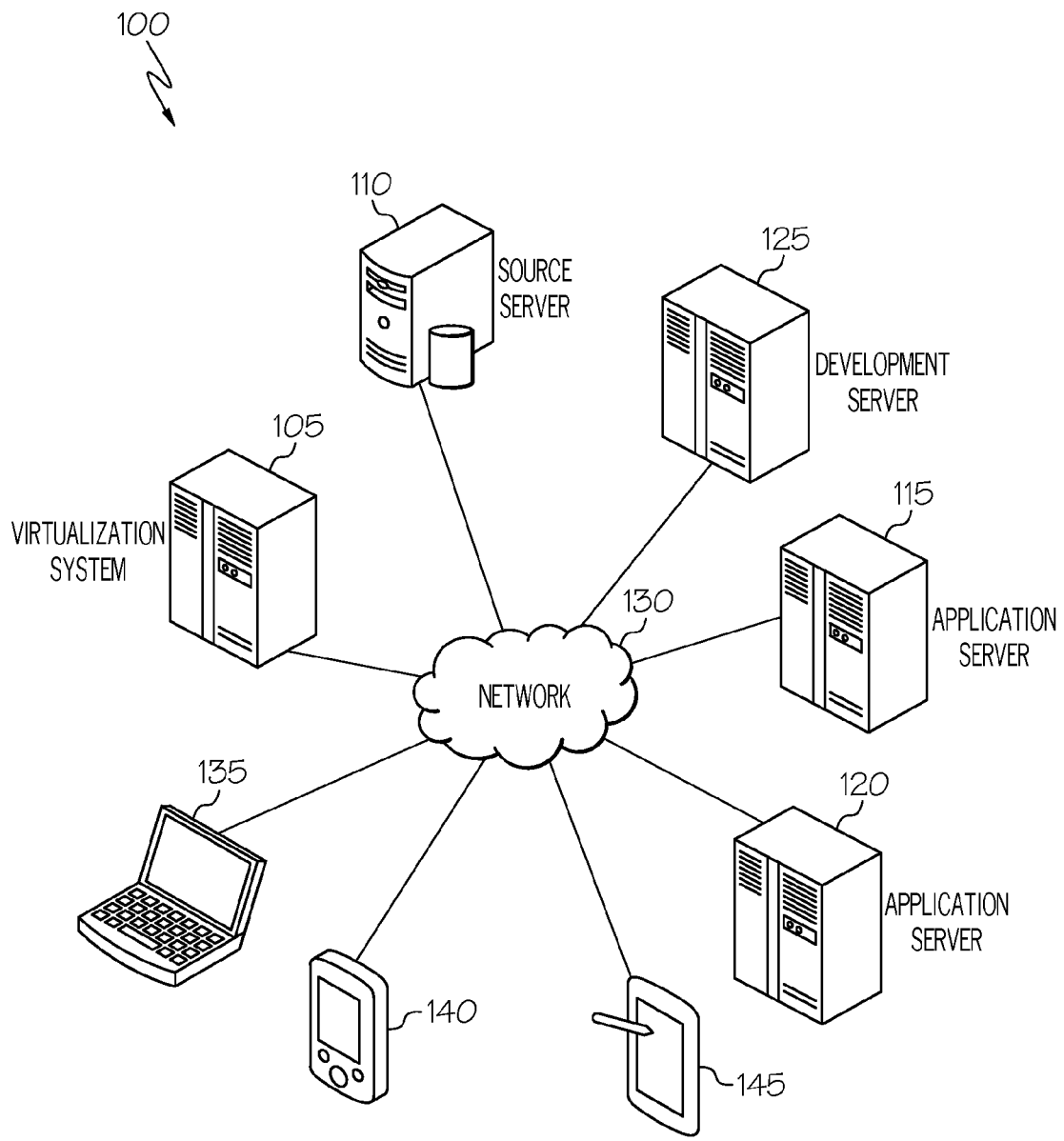
FIG. 1 is a simplified schematic diagram of an example computing system including an example virtualization system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a simplified block diagram is shown illustrating an example computing environment 100 including a virtualization system 105, one or more transaction data source servers (e.g., 110), one or more application server systems (e.g., 115, 120), including web servers, application servers, database systems, mainframe systems and other example. One or more development servers (e.g., 125), among other example systems that can make use of virtual services provided through virtualization system 105 can also be provided in environment 100. Virtualization system 105 can be utilized to virtualize components of resources hosted by systems 115, 120 upon which other systems (and their constituent components) (e.g., 125) may depend. Virtual service models can be generated corresponding to interactions between the components of applications, databases, and services provided through hosted by systems 115, 120 and systems (e.g., 125) that consume these services. A virtual service can be launched based on the virtual service model. A virtual service can operate to stand-in for the modeled component by simulating the modeled component's responses to requests and other messages received from other components (e.g., components dependent on the modeled component). The modeled, or virtualized, component synthesized using a corresponding virtual service can be used in place of the real world component, for instance, when the component or system hosting the component is offline, allows limited access (e.g., is managed or owned by a third party), under development or repair, or is otherwise unavailable, allowing software components dependent on the virtualized component to still be executed, tested, developed, etc. against the simulations provided by the virtualized component.

Virtual service models can be based on transactions between components, including transactions between applications, services, databases, and other components. A transaction can include one or more requests and corresponding responses to the requests. Transaction data can describe the requests and corresponding responses. Such transaction data can be based on recorded instances of the transactions. Such instances can be monitored and recorded and include recorded real world transaction instances as well as recorded test transaction instances involving the component(s) to be modeled. Alternatively, transaction data can be user-defined or otherwise derived to describe desired, idealized, predicted, or hypothetical responses of a particular component to various types of requests in various types of transactions. In some instances, such transaction data can be derived by identifying expected behavior of a particular component from specification data, log files, Web Services Description Language (WSDL) or Web Application Description Language (WADL) descriptions, or other structured or unstructured data describing the component's responses to various types of requests and other functionality and behavior of the component in transactions of particular types. Regardless of how the transaction data is generated, the transaction data can be processed to identify patterns and behaviors relating to how one component responds to particular messages received from other components. Transaction data can describe requests and corresponding responses, together with attributes of the respective requests and responses. In some cases, requests and responses can be transmitted between components over one or more networks (e.g., 130), among other examples.

Computing environment 100 can further include one or more user computing devices 135, 140, 145 that can be used to allow users to interface with and consume resources of virtualization system 105, application servers 115, 120, development system 125, etc. For instance, users can utilize computing devices 135, 140, 145 to automatically launch a virtual service based on transaction data in one or more data sources (e.g., hosted by one or more source servers 110). A user can also define how virtual services can be automatically launched from transaction data in response to defined triggers (e.g., detection of a change to the transaction data) that can cause automatic launching of the virtual service without further intervention of a user. User computing devices 135, 140, 145 can also be used to define or generate transaction data as well as sources for the storage of transaction data. Users, such as administrator users, can further utilize user computing devices 135, 140, 145 to instrument software components, manage recording of transactions between applications and databases, administer the generation of corresponding virtual services, and perform other tasks in connection with the generation, maintenance, and use of virtual service models. In some cases such virtual services can be used in connection with the development and testing of an application, portion of an application, or other component that is dependent on one or more other components, such as a web service, mainframe system, database, etc., among other potential uses.

In general, "servers," "clients," "computing devices," "network elements," "database systems," "user devices," and "systems," etc. (e.g., 105, 110, 115, 120, 125, 135, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 125, 135, 140, 145, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a virtualization system 105, data source server 110, application server 115, 120, or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, sub-system, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Virtual services represent a significant advancement over early technologies utilizing conventional mocking and stubbing implementations to provide a stand-in for an available component. Virtual services can more accurately synthesize a virtualized component's role in transactions with other component and can enable smarter, more life-like synthesized responses such as responses dynamically generated to account for request-sensitive values and time sensitive values, stateless and stateful responses, responses in transaction conversations, sessions, and correlated transaction contexts, responses simulating performance of the virtualized component (e.g., responsive to an assumed processor or memory load, bandwidth or other network restrictions/availability, etc.), among other examples.

While virtual services represent an advance from prior solutions, enabling more efficient and accurate modeling of dependent systems, traditional virtual services can still involve complex and specialized set-up and administration, leading to resources being dedicated to training or hiring expert administrative users to manage the generation and use of virtual services for an organization. In some cases, multiple separate experts may be involved in the deployment of a virtual service—an expert in the system that is to consume the virtual service, an expert in the system with the components that are to be virtualized, and a virtual services expert. An improved system is described that can simplify creation and management of virtual services by automating the generation and deployment of virtual services, eliminating the need, in some cases, of a separate virtualization expert to enjoy the benefits of virtualization using virtual services, among other example advantages.

Figure 2:
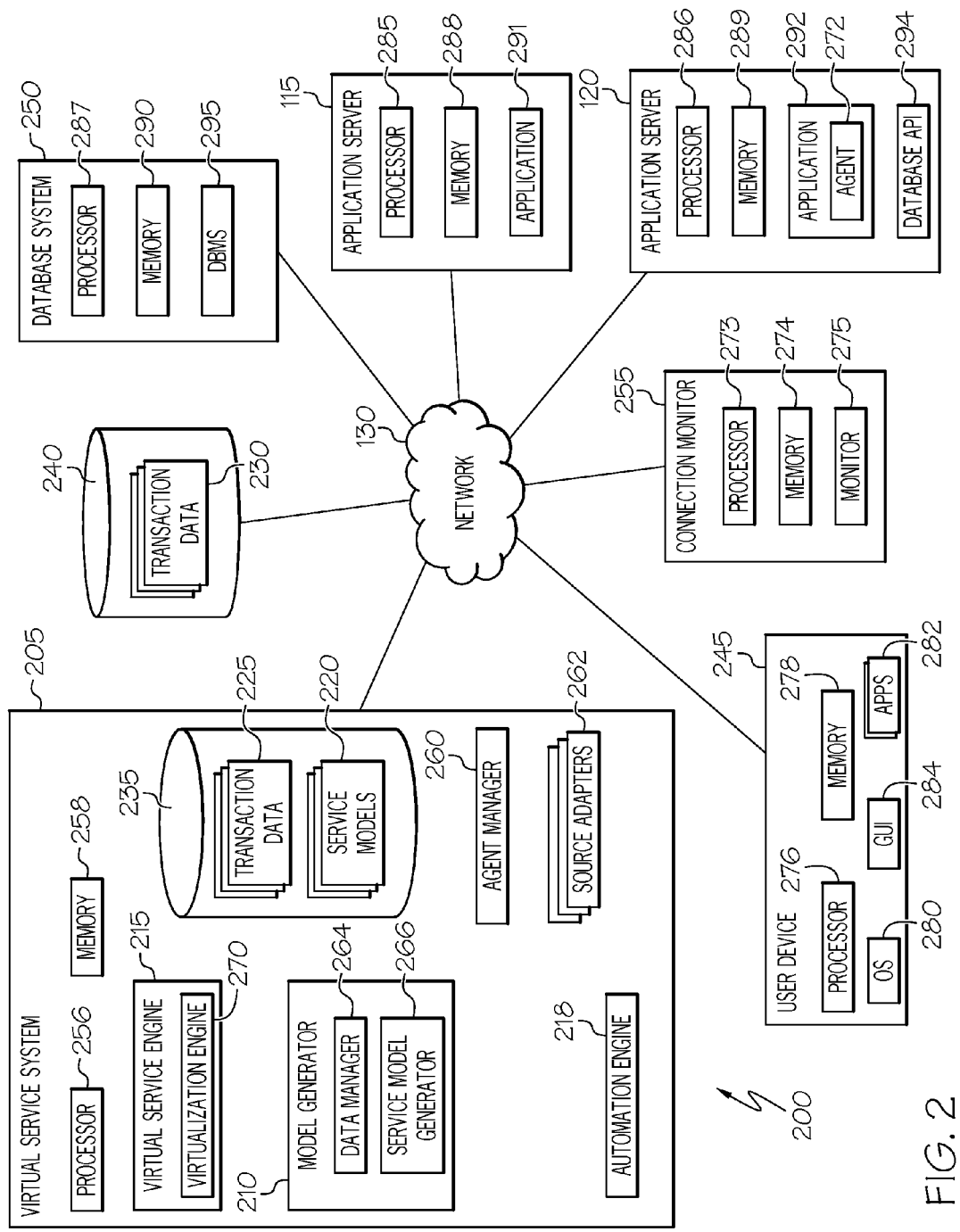
FIG. 2 is a simplified block diagram of an example computing system including an example virtual service engine and an example model generator in accordance with at least one embodiment.

At least some of the systems described in the present disclosure, such as the systems of FIGS. 1 and 2, can include functionality providing at least some of the above-described features that, in some cases, at least partially address at least some of the above-discussed issues, as well as others not explicitly described. For instance, in the example of FIG. 2, a simplified block diagram 200 is shown illustrating an example environment including a virtual service system 205 that includes a model generator 210 adapted to assist in the generation of service models (e.g., 220) that can be used by virtual service engine 215 to deploy virtual services to simulate behavior of one or more modeled components in transactions with at least one other software component. The virtual service system 205 can further include an automation engine 218 that permits automation of service model 220 generation and virtual service deployment with minimal or no user intervention from transaction data 225, 230. The automation engine 218 can define and detect conditions for triggering the generation or update of a service model 250 from transaction data 225, 230 sourced from the virtual service system (e.g., at data store 235) or from other sources (e.g., 240) defined as a repository of transaction data that is to serve as the basis of a corresponding service model modeling the transaction(s) described in the transaction data. Automation engine 218 can detect when transaction data has been provided or updated and trigger automatic generation of a service model and launch of a corresponding virtual service. Automation engine 218 can monitor data sources for the transaction data, including sources to which transaction data can be added through one or more interfaces provided to outside users or systems. The automation engine 218 can further operate with or trigger a corresponding model generator 210 that can detect and determine request/response attributes from transaction data detected by the automation engine 218 and further generate or update a corresponding service model that can be used to also launch a virtual service that would otherwise or normally be manually provided or defined by a user (e.g., using user device 245). The automation engine 218 can also parse data in the transaction data to identify aspects of the service model and/or virtual service to be automatically generated using the virtual service system 205, including the transport protocol to be used by the virtual service (e.g., HTTP, JMS, Java, etc.), data recorder attributes (ports, queues, classes, etc.), the data format of the transactions to be modeled (e.g., SOAP, XML, copybook, etc.), among other examples. These automatically determined attributes can be used to automate generation/updating of a service model and/or virtual service.

In addition to virtual service system 205, computing environment 200 can further include other systems, devices, and resource, including one or more user devices (e.g., 245), systems hosting components that can be virtualized using virtual service system 205 such as application servers 115, 120, database system 250, among other examples. Transaction data 225, 230 can be defined by users or from data describing functionality of one or more components to be modeled or that are to interact with a component to be modeled. Transaction data 225, 230 can also include transaction data describing actually transactions that have been monitored and recorded, for instance, using connection monitors (e.g., 255) or agents (e.g., 272) deployed on one or more components involved in the recorded applications, among other mechanisms.

In one example implementation, a model generator 210 can be provided that includes hardware- and software-based components, such as data manager 264 and service model generator 266. An example data manager 264 can interface with various recording components, such as monitors (e.g., 255) that monitor request and response communications (e.g., over a port or network (e.g., 130)) between components engaged in transactions, as well as agents (e.g., 272) instrumented on the components participating in the transaction, to obtain transaction data 225 from the monitoring. Data manager 264 can also obtain transaction data (e.g., 230) from a variety of other sources (e.g., 240). Indeed, sources or stores of transaction data (e.g., 230) can be designated for use in a generating a service model to instantiate a corresponding virtual service. Such stores (e.g., 240) can include directories and servers of data describing requests and corresponding responses in transactions, including request/response files, packet capture data, an organization's web server, an email inbox or other folder, among potentially limitless other stores of various forms of transaction data. Virtual service system 205 can further include source adapters 262 that include logic for interfacing with different types of outside transaction data (e.g., 230) and transaction data sources (e.g., 240). Source adapters 262 can further include logic for pre-processing a corresponding type of transaction data to extract request-response pairs in transactions described in the transaction data 230 and prepare the processed transaction data 230 for use in service models 220 generated by the virtual service system 205. In some instances, a single service model 220 can be generated from transaction data from multiple different sources and/or of multiple different types. Source adapters 262 can normalize information included in various forms of transaction data to allow a combination of different transaction data to be used to assemble a single service model that describes the universe of requests that may be fielded and that defines how responses to these requests are to be synthesized. A model generator 210 can include service model generator logic 266 that can utilize normalized transaction data to generate such service models 220. In some implementations, at least a portion of the logic or library of source adapters 262 can be integrated within the model generator 210 allowing service models 220 to be generated from a variety of different transaction data (e.g., 225, 230) from a variety of different sources (e.g., 235, 240).

Transaction data (e.g., 225, 230) can describe request-response pairs within transactions, including attributes of the requests and responses such as the values included in the requests and responses, timing of the requests and responses, the transport details regarding how the requests and responses are communicated between components, among other examples. Transaction data (e.g., 225, 230) can further describe one or more characteristics associated with the activity and/or the context in which that activity occurs. For instance, transaction data can be generated to describe monitored transactions. Transaction data can include information collected by the monitoring components (e.g., agents 272, connection monitor 255, etc.) describing characteristics observed by the monitoring component including information beyond the attributes of the recorded requests and responses, such as information concerning the context or environment in which the recording takes place. Transaction data (e.g., 225, 230) can include, for example, a frame identifier, which identifies a message in a transaction; a parent identifier, which identifies the requester that generated the request sent to the component or sub-component monitored by the agent; a transaction identifier, identifying the transaction, with respect to the component or sub-component being monitored; and an identifier that identifies the monitoring component that captured or generated the monitoring data, among other examples. Characteristics can further include other information describing the message or transaction such as a system clock value, current processor and/or memory usage, contents of the request, contents of the response to the request, identity of the requester that generated the request, identity of the responder generating the response to the request, Java virtual machine (JVM) statistics, structured query language (SQL) queries (SQLs), number of database rows returned in a response, logging information (e.g., messages logged in response to a request and/or response), error messages, session identifiers, database connection identifiers, simple object access protocol (SOAP) requests, other values generated by the monitored component that are not provided in the request or the response, web service invocations, EJB method invocations, EJB entity lifecycle events, heap sizing, and the so on. Characteristics can also include the thread name of a thread processing the request to generate the response, the class name of the class of an object invoked to process the request to generate the response, a Web Service signature used to contain the request and/or response, arguments provided as part of the request and/or response, a session identifier, an ordinal (e.g., relating to an order within a transaction), the duration of time spent processing the request and/or generating the response, state information, a local Internet Protocol (IP) address, a local port, a remote IP address, a remote port, among other examples.

Monitoring components can monitor and report characteristics independently for each transaction in which the monitored component being monitored participates. In addition to monitoring the performance of a single component and aggregating information about that component over a multitude of transactions (such that information about the performance of individual transactions can, for example, be averaged, based upon the observed performance of the component over the course of performing the multitude of transactions), monitoring components can additionally detect characteristics that are specific to and correlated with a specific transaction between a particular component and another component. More particularly, detected characteristics can be specific to and correlated with a particular request and/or response generated as part of a transaction.

As noted above, transaction data can be manually created by users, derived from data describing functionality of the component to be modeled, or generated from monitoring of actual transactions. In the case of transaction data generated from transaction monitoring, a variety of monitoring mechanisms, components, or logic can be used to capture requests and responses between components. Such components can include components, such as connection monitor 255, that can monitor communications between components over ports or networks (e.g., 130). In one example implementation, a connection monitor 255 can include a processor 273, memory 274, and monitoring logic 275 implemented in software and/or hardware of the connection monitor 255.

Other monitors can be used to record transaction including agents (e.g., 272) instrumented on one or more of the components (e.g., application 292) involved in a transaction. In some implementations, a virtual service system 205 can include an agent manager 260 that can include functionality for interfacing with one or more agents (e.g., 272) instrumented in virtual machines, applications, or software components, such as software components involved in transactions involving a Java-based system, database, .NET-based system, or other system or component. For example, in some implementations, agents can include functionality similar to functionality described, for instance, in U.S. patent application Ser. No. 11/328,510, titled "Instrumentation System and Method for Testing Software," filed Jan. 9, 2006, which is hereby incorporated by reference in its entirety as if completely and fully set forth herein. Agent manager 260 can manage recording of transactions using deployed agents (e.g., 272). Agents can capture data as it enters or exits the software component including data describing method calls and other requests, and corresponding responses, that are exchanged between the instrumented software component(s) and other components. Agents can be used, for instance, to capture transactions between an application and a database using, for instance, a database API (e.g., 294) used by the software component (or application, virtual machine, etc.) to interface with databases, among other examples. Not only can agents capture the contents of requests and responses, but agents can also capture context data, such as session data, connection data, timing data, and other information that can be used to associate various requests and responses together. Agents can inspect the internal data of a component upon which it is implemented and such internal data can also be reported as context data. Such context information can be further used to identify correlations between multiple services or components within a transaction context.

In some cases, instrumentation agents (e.g., 272), or agents, can be software-implemented agents that are configured to provide visibility into the operations of each instrumented component to one or more agent managers provided in connection with a virtualization system. Each instrumentation agent (e.g., 272) can be configured to detect requests and responses being sent to and from the component in which that agent is embedded. Each agent can be configured to generate information about the detected requests and/or responses and to report that information to an agent manager (e.g., 260) within, coupled to, or otherwise associated with a virtual service system 205. Additionally, each agent can be configured to detect and report on activity that occurs internally to the component in which the agent is embedded.

In some cases, there may be a single instrumentation agent per component, while other embodiments may be implemented differently. For example, in some systems, there can be a one-to-one correspondence between the number of instrumentation agents within a component and the number of processes (or other subcomponents) to be monitored within that component. In such embodiments, each instrumentation agent monitors and reports on its corresponding sub-component. In other instances, a single agent can monitor and have visibility into multiple components, among other examples.

In some implementations, a model generator 210 can obtain a variety of information concerning transactions from the various forms of transaction data (e.g., 225, 230) identified as corresponding to the transactions and components to be modeled. Service model generator 266 can organize this information, for instance, to group information relating to common transaction fragments, transactions, and sessions (involving multiple transactions) and generate service models 220 from the transaction data (e.g., 225, 230). Service models 220 can include models that model a single service or component as well as composite service models that model multiple services and/or components within a business transaction including multiple correlated transactions involving the multiple components, among other examples.

As noted above, service model generator 248 can organize information in monitoring data 252 so that information that describes characteristics of a particular transaction or business transaction involving multiple correlated transactions is grouped with other information describing the same transaction. Thus individual frames, each of which can be received from a different instrumentation agent or other monitoring component can be organized into groups of frames that describe a complete transaction. Such grouping can be based on detecting correlations between requests and responses, including timing information indicating a temporal relationship between the transactions, common tags inserted by an agent in intercepted requests and responses, an identified parent-child or requester-responder relationship between components in the transaction, common values (e.g., transaction ID, customer ID, session ID, etc.) included in captured requests and responses, recurring patterns in conversations or flow between the components participating in transactions, among other examples.

In some cases, agents and other monitoring components can be provided with functionality for tagging data of a request or response monitored by the agent before it exits or enters the component it monitors, the tag identifying a particular session or transaction to which the request or response and corresponding characteristic information belongs. After being sorted, the frames can be arranged in ascending or descending order, for instance, using timing information, inserted tag data, or other information. For example, the frames can be sorted according to a timestamp indicating when each frame was generated, when one or more requests identified in each frame were generated or received, and/or when one or more responses identified in each frame were generated or received. In some embodiments, the frames can be sorted based upon multiple pieces of timing or other flow information. Additionally, a flow can be identified by identifying the requester/responder, parent/child relationships of each portion of the business transaction, among other information.

Within a group of frames associated with the same transaction or session, service model generator 266 can order the frames, such that the flow of the transaction can be followed from the start of the transaction to the end of the transaction. Each frame can include a field that identifies that frame (e.g., a frame ID), as well as a field that identifies a parent frame (e.g., a parent frame ID). The value of each frame's parent frame ID can equal another frame's frame ID. These frame identifiers can be generated, in some cases, by the agents. In one embodiment, the frame identifiers can be generated from information identifying the IP address (or other addressing information), port number, session identifier, or other information used by the monitored component or sub-component, the amount of data sent or received by the monitored component during the monitored activity, and/or the instrumentation agent itself.

A virtual service engine 210 can use a set of expected requests and responses defined in service models 220 to provide one or more virtual services simulating operation of a modeled component, such as a database, applications (e.g., 291, 292), mainframe components, or other component. Service models can further support stateful virtualization and imitate a series of particular requests in a session. In one example, virtual service engine 215 can include hardware- and software-based components, such as virtualization engine 270, among potentially other example components. Virtualization engine 270 can be provided to instantiate or launch virtual services from service models 220. Instantiation of a virtual service can include deploying logic in a computing device and/or virtual machine that is to host the virtual service and serve as the redirect target for intercepted requests intended for the real world, or live version of the component simulated using the virtual service. Virtualization engine 270 can build a virtual service environment within a hosting device or virtual machine and provision the virtual service environment with virtual service logic that is access a particular one of the service models 220 and generate synthetic responses to received requests based on the particular service model.

A service model can be provided to stand-in for an unavailable, real world version of the modeled component. For example, it can be identified that a dependency of an application (e.g., 291), such as another application (e.g., 292), is unavailable. A virtual service model 220 corresponding to the dependency can be identified and a corresponding virtual service simulating the other application (e.g., 292) can be initiated. Such virtual services can be generated and provided according to principle described in U.S. Pat. No. 8,112,262 entitled "Service Modeling and Virtualization", among other examples. For instance, in some cases, virtualization engine can provision a virtual service in a virtual machine with which a software component can interact with directly in lieu of the modeled dependency. In other instances, virtualization engine 270 can utilize agents (e.g., 272) to provide the responses of a virtualized dependency. For example, virtualization engine 270 can communicate with agents provisioned on the consuming system to intercept particular requests from the consuming component and generate synthetic responses consistent with a transaction defined in a corresponding service model 220 that mimics the response that would be received from a live version of the dependency.

As noted, service models (e.g., 220) generated by a model generator 210 can be based on requests and responses between two or more software components or systems (such as an application (e.g., 292) and database (e.g., hosted by database system 250). Requests that are to be sent to a real world version of a virtualized component can be intercepted and directed to the virtual service standing in its place. A virtualization engine 270 and/or virtual service logic provisioned on a host of the virtual service, can receive intercepted requests intended for the virtualized component and identify respective transactions (or request-response pairs), defined in a service model (e.g., 220) corresponding to the virtualized component, that corresponds to a request of that type and having similar attributes values or types. The service model can further describe characteristics of the transactions. Such information can include timing information identifying time thresholds or limits at which particular requests and/or responses are detected or sent (e.g., in order to identify the delay between when the request was detected and/or sent and when the associated response was detected and/or sent), and the like. Virtual services instantiated from such service models can embody these performance characteristics captured or defined in the service model, including response times, network bandwidth characteristics, processor usage, etc.

In one example, a virtualization engine 270 can be configured to identify and describe requests and responses in each of a variety of different protocols as well as the pertinent information from each. Thus, service models can include configuration information identifying the basic structure of requests and responses for each of several supported communication protocols. Depending upon the protocol in use, for instance, requests can take the form of method calls to an object, queue and topic-type messages (e.g., such as those used in Java messaging service (JMS)), requests to access one or more web pages or web services, database queries (e.g., to a structured query language (SQL) or Java database connectivity (JDBC) application programming interface (API)), packets or other communications being sent to a network socket, and the like. Similarly, responses can include values generated by invoking a method of an object, responsive messages, web pages, data, state values (e.g., true or false), and the like.

Service models 220 can be used as the basis of virtual services modeling the software components providing the requests and/or responses modeled in the service models 220. Virtual services can capture and simulate the behavior, data and performance characteristics of one or more unavailable or inaccessible component, making synthetic substitutes of the components available, for instance, in connection with development and testing efforts throughout the software lifecycle, among other advantages. Virtual services, generally, can provide functionality beyond traditional piecemeal responders or stubs, through logic permitting the recognition of input/requests and generation of outputs/responses that are stateful, aware of time, date, and latency characteristics, support such transaction features as sessions, SSL, authentication, and support string-based and dynamic request/response pairs, among other features. Service virtualization and other virtual models can be leveraged, for instance, when live systems are not available due to project scheduling or access concerns. In cases where components have not been built yet, environments can employ virtual services to rapidly model and simulate at least some of the software components to be tested within an environment. Virtual services can be invoked and executed in a virtual environment implemented, for instance, within on-premise computing environments, agents, in private and public cloud-based lab, using virtual machines, traditional operating systems, and other environments, among other examples.

As noted above, in some implementations, when a service model is used to instantiate a virtual service, the virtualization process can involve comparing new requests generated by a requester (e.g., a client application under development) to the request information stored in a corresponding service model. For example, if a new request containing a particular command and attributes is received, the service model can be searched for a matching request that contains the same command and attribute. If a matching request is found, the virtualization process returns the response (as identified by information stored in service model) associated with the matching request to the requester.

In many situations, the requests provided to a virtual service will not be exactly the same (i.e., containing the same request as well as the same attribute(s)) as the requests identified in service model. For example, a request provided to the corresponding virtual service may contain the same request but a different attribute or set of attributes. A service model can further include information usable to handle these requests. For instance, transactions containing requests that specify the same command can be identified as being of the same transaction type. Alternatively, a set of transactions can be identified as being of the same type if all of those transactions have requests that include the same command as well as the same number and type of attributes. The particular technique used to identify whether two or more transactions are of the same type can be protocol specific, in some embodiments (e.g., classification of transactions can be at least partially dependent upon the particular communication protocol being used between the requester and the server).

For each unique type of transaction included in a service model, some implementations of a service model can further provide information or instructions for use by a virtual service in generating responses to requests with unknown attributes (e.g., an unknown attribute that was not observed as part of the monitored traffic or even specified by a user during a manual service model building process). Further, service models can also include information describing how to respond to an unknown request (e.g., a request that contains a command that was not observed as part of the monitored traffic). As an example, the request portion of this service model information can indicate (e.g., through the use of a wildcard command identifier) that all unknown types of requests that are not otherwise identified in service model should match this request. The response portion of the generated information can include an appropriate response, among other examples.

In addition to adding information describing unknown transactions of known and unknown types, some implementations of service models can support time sensitive responses. In such embodiments, response information in the server model can facilitate substitution of time sensitive attributes for actual observed attributes. For instance, an actual attribute "10:59 PM Oct. 1, 2009" can be replaced with a time sensitive value such as "[SYSTEM CLOCK+11 HOURS]". When the service model is used to generate responses by the virtual service, the time sensitive value can be used to calculate the appropriate attribute to include in each response (e.g., based on the current system clock value). To illustrate, in this particular example, if the service model is being used by a virtual service and the response attribute includes the time sensitive value [SYSTEM CLOCK+11 HOURS], the response generated based upon the service model will include the value generated by adding 11 hours to the system clock value at the time the request was received. In general, time sensitive values specify an observable time, such as a time value included in a request or the current system clock time, and a delta, such as an amount of time to add or subtract from the specified observable time. Time sensitive values can be included in the response information for all types (known and unknown) of transactions.

In some implementations, a service model can further include information facilitating the use of request sensitive values to be included in responses generated by the virtual service using the service model. A request sensitive value can link an attribute included in the request to a value to be included in the response. For example, response information in a service model can indicate that a particular request attribute be used as the basis of a particular attribute of the response to be returned in response to the request.

When the model is used, the response generated by the virtualized service will include the value indicated by the request sensitive value. For example, the model can include three known transactions of a given transaction type, as well as one unknown transaction of that type. The information describing the unknown transaction can indicate that the single response attribute is a request sensitive attribute that should be the same as the first attribute of the request. A request of that type that contains an unknown first attribute (i.e., an attribute that does not match the attribute(s) stored for the three known transactions of that type in the model) can be sent to the virtualized service. In response to receiving this request and accessing the request sensitive value specified in the response information for the unknown transaction, the virtualized service returns a response that includes the value of the first attribute that was contained in the received response. As an example, if the information describing a known transaction of type A indicates that the request includes the string "UserID" as the first request attribute and that the corresponding response includes the string "UserID" as its second response attribute, a request sensitive value specifying "[REQUEST ATT 1]" (first request attribute) can be generated for the second response attribute in the service model, among many other potential examples, including more complex examples with more complex dependencies defined in the service model between certain request attribute and request sensitive response attributes.

A service model can include still additional information. For example, a service model can identify characteristics of each transaction in order to identify availability windows for a corresponding software component modeled by the service model, load patterns for the software component, and the like. For example, if an access window is identified for a particular type of transaction, a corresponding service model can be generated to include a characteristic indicating that a response (or a particular type of response) will only be generated if the request is received during the identified access window, among many other potential examples.

Turning to FIG. 3, a simplified block diagram is shown representing an example view of an example service model 300. For instance, FIG. 3 shows information that can be maintained as part of a service model. In this particular example, service model 300 can include a row for each of several transactions. Each row of service model 300 can identify a command, zero or more attributes, zero or more characteristics, and one or more response attributes. This service model can be stored in a spreadsheet, table, database, or any other data structure.

In this example, transaction 301(A) is a transaction corresponding to a scenario defined in an interaction contract defined between two or more developers. In other instances, transaction 301(A) can be a transaction that was an observed transaction that actually occurred between a requester and a server component being modeled, as detected, for instance, by an agent or other tool. The information describing transaction 301(A) can include request information, which includes command 311 and zero or more defined attributes 321(1). The information describing transaction 301(A) can also include response information 341(1) describing the expected response that corresponds to the request. This response information 341(1) can also include one or more attributes. Characteristics 331(1) can include zero of more characteristics of transaction 301(A) defined based on scenarios of the interaction contract. These characteristics can include timing information describing a threshold delay of a response to a request or the like, as described above.

Transaction 301(B) can be of the same transaction type as transaction 301(A), since both transactions included a request that contained command 311. Transaction 301(B) is described by attributes 321(2) (which can have values that differ from those attributes defined in the request of transaction 301(A)), characteristics 331(2) (which can again differ from those for transaction 301(A)), and response 341(2) (which can also have a value that differs from the response defined for transaction 301(A)).

In this example, information describing n (an integer number) known transactions of the same type as transactions 301(A) and 301(B) is stored in service model 300. These known transactions are transactions that were either generated from scenario data or manually specified by a user. As part of the model building process, information describing an n+1th transaction of the same type has been added to service model 300 by the service model generator. This n+1th transaction, labeled transaction 301(n+1), can describe an "unknown" transaction of a known type of transaction. Such an unknown transactions is of a known type because it has the same command, command 311, as the other transactions of this type. However, unlike the other known transactions of this type, unknown transaction 301(n+1) can be used to respond to requests containing command 311 and "unknown" attributes that do not match those known attributes stored for transactions 301(A)-201(n) (not shown). The information describing transaction 301(n+1) thus includes information (e.g., wildcard information) identifying unknown attributes 321(n+1), such that any request that includes command 311 and an attribute that does not match the defined attributes stored for the actual transactions (e.g., such as transactions 301(A) and 301(B)) will match the request information for transaction 301(n+1). The information describing transaction 321(n+1) can also include default characteristics 331(n+1) and default response 341(n+1). These default values can be copied from the corresponding fields of an actual response of the same type.

Information describing another set of transactions of a different type can also be stored within the service model 300 for a particular software component. As shown, m+1 transactions, including transaction 302(A), 302(B), and 302(m+1) of a type of transaction in which the request includes command 312 can be stored in service model 300. Like transactions 301(A) and 301(B), transaction 302(A) can be another transaction corresponding to a scenario and involving the particular software component. Further, the information describing this transaction can also include the corresponding command 312, attributes 322(1) (if any), defined characteristics 332(1) (if any), and corresponding response 342(1).

In some instances, a model generator can automatically generate a set of requests and responses, together with corresponding attributes and characteristics of the requests and responses based on computer-parsable scenario data provided to the model generator. In some implementations, a user can supplement the transaction defined by the model generator with one or more user-specified transactions, for instance, in the event of a change or exception to the interaction contract or to capture a nuance not adequately detected and captured by the model generator, among other examples. For instance, a user can enter the information describing such a transaction via a user interface. The information describing transaction 302(B) can include command 312, zero or more user-specified attributes 322(2), zero or more user-specified characteristics 332(2), and a user-specified response 342(2). In some embodiments, the user is prompted for entirely new information for each of these user-specified fields. In other embodiments, the user can be allowed to select an existing field (e.g., of another user-specified transaction or of an automatically-detected transaction) to copy into one or more of these fields. It is noted that a user can also create a user-specified transaction by modifying information describing an actual transaction. As FIG. 3 shows, user-supplied transaction information can be stored in the same model as transaction information generated from parsing of scenario data of an interaction contract. In other instances, service models can be generated that are dedicated to user-supplied transaction information while others are dedicated to transaction information generated from scenario data by a model generator, among other examples.

In some instances, a service model 300 can also include information describing an unknown transaction 302(m+1). The information describing transaction 302(m+1) was added to service model 300 after m (an integer number, which does not necessarily have the same value as n) known transactions were described by the model. The information describing this unknown transaction 302(m+1) can be used to handle requests of the same type (e.g., containing command 312) that specify unknown attributes. Accordingly, the information describing transaction 302(m+1) can include command 312, unknown attributes 322(m+1) (i.e., attribute information that will match any attributes not identified in the known attributes stored for the other m transactions of this type), default characteristics 332(m+1), and default response 342(m+1). Further, transactions of an unknown transaction of unknown type (e.g., 303) can also be defined in a service model 300. For instance, the information describing transaction 303 can be used to respond to any request of a type not already described by another row of service model 300. Accordingly, a request containing a command other than commands 311 and 312 could be responded to using the information describing transaction 303, among other examples. As shown, the information describing transaction 303 includes unknown command information 313, which is configured to match any command not already specified in service model 300, unknown attribute information 323, which is configured to match all attributes (if any) associated with unknown commands, default characteristics 333, and a default response 343. As with the default characteristics and responses associated with unknown transactions of known type, transaction 303's default characteristics and response can be user-specified.

Figure 4:
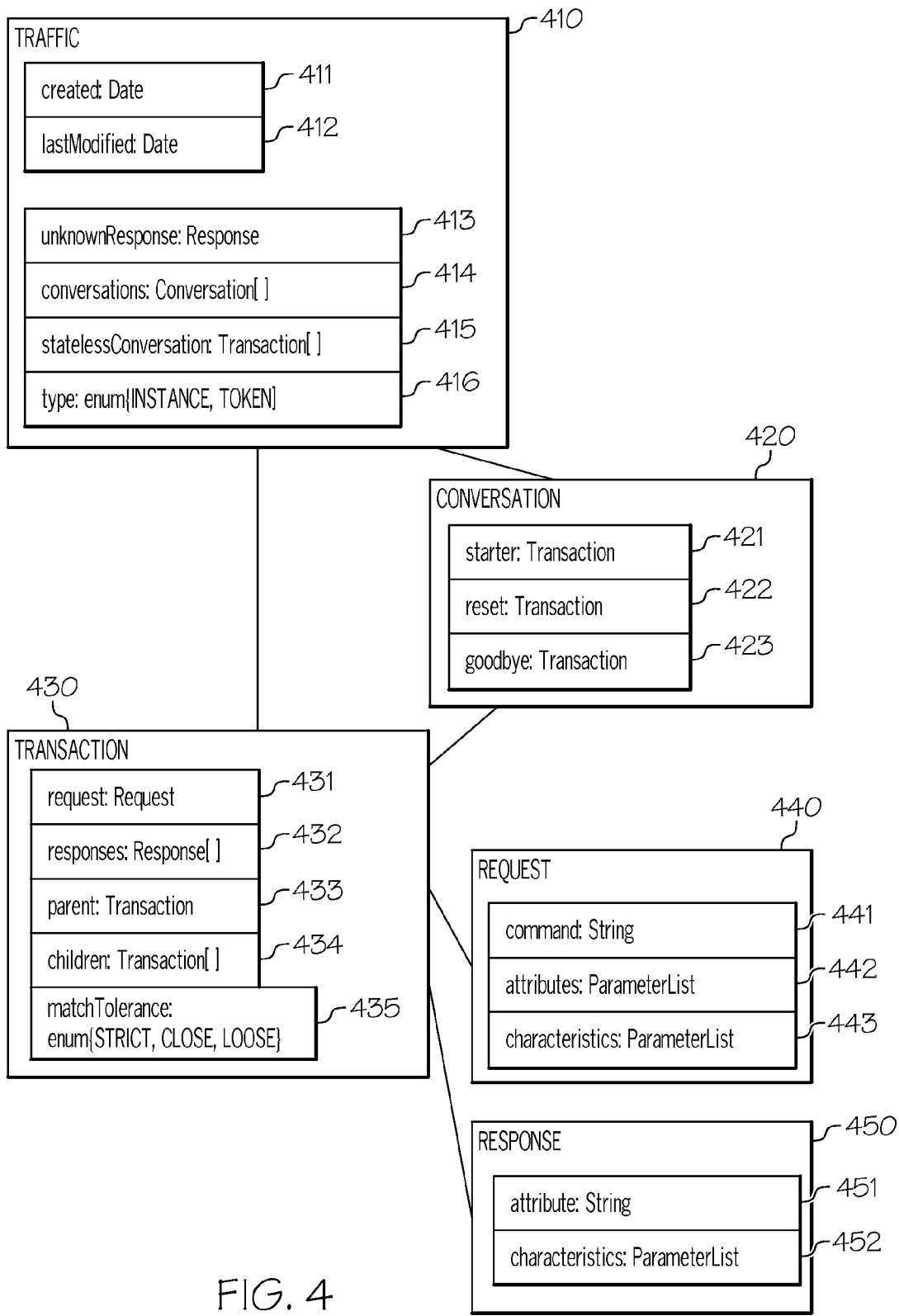
FIG. 4 is a simplified block diagram illustrating aspect of another example service model in accordance with at least one embodiment.

Turning to FIG. 4, a simplified block diagram is shown illustrating representing example features of an example service model for use in virtual services supporting stateful and stateless transactions. Statefulness of a transaction can be identified from parsing of scenario data to generate a service model supporting the modeling of such stateful transactions. In the example of FIG. 4, a data model is shown that includes five data patterns: traffic pattern 410, conversation pattern 420, transaction pattern 430, request pattern 440, and response pattern 450. Traffic pattern 410 can be used to store information identifying a particular software application to be developed in accordance with an interaction contract and the transactions of such an application. Each service model can include a single instance of traffic pattern 410. As shown, traffic pattern 410 includes created field 411, which stores date information identifying when the service model of that particular application was initially created. Traffic pattern 410 also includes lastModified field 412, which stores date information identifying the most recent time at which any of the information in the service model of the particular service was modified.

Traffic pattern 410 can also include an unknownResponse field 413. UnknownResponse field 413 can store information identifying the particular instance of the response pattern that stores information identifying the response to use for unknown transactions of unknown types. Accordingly, in embodiments employing the data pattern of FIG. 4, if an unknown transaction of unknown type is detected by a request processing module, the request processing module will use the response pattern instance identified in unknownResponse field 413 to generate a response.

Traffic pattern 410 includes conversations field 414. Conversations field 414 can identify one or more instances of conversation pattern 420. Conversation pattern 420 stores information representing a set of two or more stateful transactions. Such a set of stateful transactions is referred to herein as a conversation. The instance(s) of conversation pattern 420 identified in conversations field 414 identify all of the conversations for the application to be modeled. If the particular service does not include any stateful transactions (e.g., if no stateful transactions are identified from scenarios defined for an interaction contract), conversations field 414 will not identify any instances of conversation pattern 420.

Traffic pattern 410 can additionally include statelessConversation field 415. This field can identify one or more instances of transaction pattern 430. Transaction pattern 430 stores information representing a transaction. Each instance of transaction pattern 430 identified in statelessConversation field 415 stores information identifying a stateless transaction. StatelessConversation field 415 can identify instances of transaction pattern 430 associated with both known and unknown transactions of known types. If the particular service being modeled does not include any stateless transactions, statelessConversation field 415 will not identify any instances of transaction pattern 430. Type field 416 can store one of two values: INSTANCE or TOKEN that identifies the type of stateful transactions, if any, provided by the service being modeled.

As noted above, conversation pattern 420 can store information identifying a set of stateful transactions. A given service model can include n instances of conversation pattern 420, where n is an integer that is greater than or equal to zero. Conversation pattern 420 can include a starter field 421. This field stores information identifying an instance of transaction pattern 430 associated with a starter transaction. The starter transaction is a transaction that acts as the first transaction in a stateful series of transactions (e.g., a login transaction). In at least some embodiments, all starter transactions can be unknown transactions of known type, as will be described in more detail below. The particular transaction type to use as a starter transaction can be specified by the model generator or a user during the service model configuration process.

Conversation pattern 420 also includes reset field 422. Reset field 422 stores information identifying one or more instances of transaction pattern 430, each of which is associated with a reset transaction (such a reset transaction can be a known or unknown transaction). The value of reset field 422 can be provided by a user (e.g., the user can be prompted to identify the reset transaction(s) for each conversation). A reset transaction is a transaction that, if detected, causes the flow of the conversation to return to the point just after performance of the starter transaction. Conversation pattern 420 also includes a goodbye field 423. This field stores information identifying an instance of transaction pattern 430 associated with one or more goodbye transactions (of known or unknown type) for the conversation. A goodbye transaction is a transaction that causes the conversation to end. To reenter the conversation after a goodbye transaction is performed, the starter transaction for that conversation would need to be re-performed.

Transaction pattern 430 stores information identifying a transaction. Transaction pattern 430 includes request field 431, responses field 432, parent field 433, children field 434, and matchTolerance field 435. Transaction pattern 430 can be used to store stateful and stateless transactions (in some instances, the same transaction can occur both within a conversation and in a stateless situation where no conversation is currently ongoing). Transactions that are always stateless will not include values of parent field 433, children field 434, or matchTolerance field 435.

Request field 431 identifies the instance of request pattern 440 that stores information identifying the request (e.g., by command and attributes) portion of the transaction. Similarly, responses field 432 identifies one or more instances of response pattern 450 that store information identifying the response(s) that are part of that transaction. Each instance of response pattern 450 stores one response attribute (e.g., like those shown in FIG. 2), and thus if responses field 432 identifies multiple response patterns, it indicates that each of the identified response patterns should be used to generate a response when the corresponding request is received.

Parent field 433 stores a value identifying the instance of transaction pattern 430 associated with the transaction that occurs immediately before the current transaction in a conversation. Thus, if transaction pattern 430 stores information identifying the second transaction in a conversation (where the starter transaction is the first transaction in the conversation), parent field 433 can identify the instance of transaction pattern 430 associated with the starter transaction. Similarly, children field 434 can store information identifying each instance of transaction pattern 430 associated with a child transaction of the current transaction. Thus, if transaction pattern 430 stores information identifying the second transaction in a conversation, children field 434 can store information identifying the instance of transaction pattern 430 that stores the third transaction in the conversation. It is noted that children field 434 can identify more than one transaction.

MatchTolerance field 435 can store one of three values: STRICT, CLOSE, or LOOSE. The stored value indicates the match tolerance for a request received immediately subsequent to the current transaction. Strict tolerance indicates, for instance, that, if a conversation is ongoing, the request received immediately after the current transaction is only allowed to match transactions identified in the current transaction's children field 434. If instead close tolerance is specified, the request received immediately after the current transaction can match any of the current transaction's children, as well as any of the current transaction's sibling transactions. Further, if loose tolerance is specified, even more transactions are candidates for matching the next received request, and so on.

Request pattern 440 can include a command field 441, attributes field 442, and characteristics field 443. Each instance of request pattern 440 stores information identifying a particular request. A service model generator can allocate an instance of request pattern 440 for each transaction of known or unknown type. Command field 441 can store a string that identifies the command contained in the request. Attributes field 442 can store a parameter list that includes zero or more parameters, each of which represents an attribute of the request. Characteristics field 443 can store a parameter list identifying zero or more characteristics associated with the request. Each parameter in the list can identify a different characteristic. Examples of characteristics can include the time at which the request was sent, the system clock time at which the request was received by the service being modeled, network and/or system conditions that were present when the request was received, and the like. The parameters stored in characteristics field 443 can be used to generate time sensitive values, as well as to model actual conditions such as response timing and availability window, among other examples.

Response pattern 450 can include an attribute field 451 and a characteristics field 452. Attribute field 451 stores a string that represents a response attribute. As noted above, a given transaction can have multiple response attributes (e.g., responses field 432 of transaction pattern 430 can identify multiple instances of response pattern 450), and thus generating a response can involve accessing multiple response patterns in order to include the string identified in each of the response patterns' attribute field 451 in the response. Attribute field 451 can store one or more response attributes, as well as values, like request sensitive values and time sensitive values, generated by the service model generator. Characteristics field 452 can store a parameter list containing zero or more parameters. Each parameter can identify a characteristic of the response, such as the system clock time when the response was sent to the requester by the service, network and/or system conditions that were present when the response is to be sent, and the like.

Returning briefly to the discussion of FIG. 2, an example computing environment can further include other systems. For instance, application servers 115, 125 can be provided that each host one or more applications (e.g., 291, 292). An application server (e.g., 115, 120) can include one or more processors (e.g., 285, 286) and one more memory elements (e.g., 288, 289). In some instances, software components of applications (e.g., 291, 292) hosted by application servers 115, 120 can access one or more databases (e.g., on 250) using one or more database APIs or drivers (e.g., 294). Databases can be hosted by external database systems (e.g., 250) with which applications can interact over one or more networks (e.g., 130). Database systems (e.g., 250) can include one or more processors (e.g., 287) and one more memory elements (e.g., 290) along with a database management system (DBMS) (e.g., 295), such as a DBMS configured to interface with and manage connections with potentially multiple applications including applications using one or more database APIs (e.g., 294) to access a database, among other examples.

Computing environment can further include one or more user devices (e.g., 245) that can be used to administer the generation of service models 220 and instantiation of corresponding virtual services through a virtual service system (e.g., 205). In some implementations, trained administrative users can utilize a user device 245 to administer aspects and tasks in the virtualization of a particular component. For instance, an administrator can manually administer recording of transaction data (e.g., start and stop a recording tool), define characteristics of a corresponding service model that is to be generated from the transaction data, and define attributes of a virtual service that is to be instantiated from the service model (e.g., the technology and transport to be employed, where and how the virtual service is to be deployed, etc.), among other examples. For instance, a user may be asked to start a recorder, manually configure the transport protocol to be used by the virtual service (e.g., HTTP, JMS, Java, etc.), manually configure recorder endpoint details (ports, queues, classes, etc.), manually identify the data format of the transactions to be modeled (e.g., SOAP, XML, copybook, etc.), manually deploy the virtual service (e.g., identify a corresponding virtual service model and deploy the virtual service on a particular virtual service environment), and manually start the virtual service, among other examples. These and other steps can be automated using Service virtualization can be simplified through the provision of an automation engine 218 that can cause a virtual service to be created and launched automatically in response to a user (or system) merely providing transaction data that describes request-response pairs in a transaction. In some examples, a user can utilize a GUI (e.g., 284) to provide transaction data to a data source. The transaction data can be provided by the user through a variety of mechanisms, such as an email inbox, web server, directory, or other mechanism that can allow transaction data to be transferred from the user (e.g., from the user device 245 memory 278) to a data source or store (e.g., 235, 240) monitored by automation engine 218. A user can define (e.g., through one or more GUIs (e.g., 284)) rules for generating and launching a virtual service from transaction data detected at a data source. For instance, a user can define a pointer to the data source, such as a directory, and cause the pointed-to data source to be monitored (e.g., by automation engine 218) for changes to transaction data stored/added to the data source. Additionally, in some implementations, a user can define conditions for triggering the automated generation and launch of a virtual service from transaction data added to a designated source (e.g., such as a source to which recorded transaction data is automatically deposited (e.g., by connection monitor 255)), such as a threshold amount of data, type of update, time between updates to the source, among other potential examples. An example user device (e.g., 245) can provide GUIs (e.g., 284) allowing a user to perform such activities and include a processor 276, memory 278, an operating system 280, one or more software applications 282, among other example hardware and/or software components.

Figure 5:
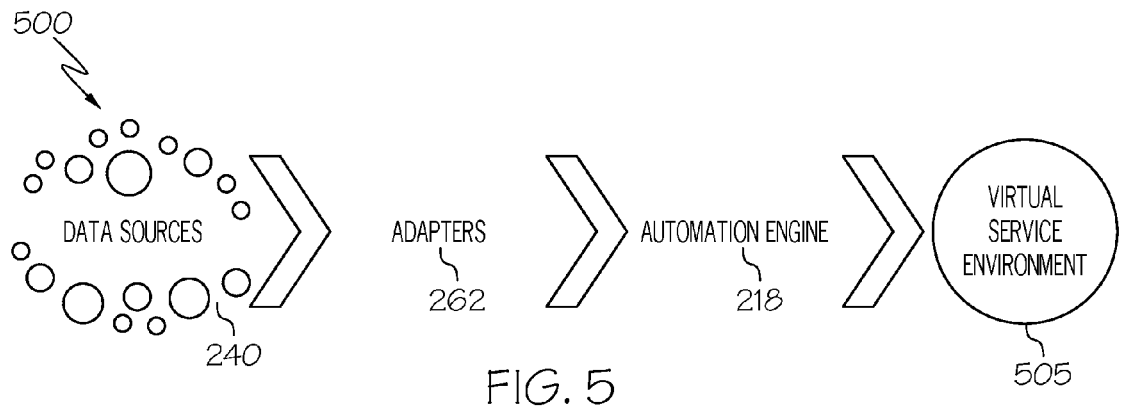
FIG. 5 is a simplified block diagram illustrating aspects of an example automatic generation and deployment of a virtual service in accordance with at least one embodiment.

Turning now to FIG. 5, a simplified block diagram is shown illustrating a flow in components used in an example automation of generating and launching a virtual service. A virtual service can be provisioned in a virtual service environment 505 automatically from transaction data detected within data sources (e.g., 240). A plurality of different data sources (e.g., 204) can be provided for accepting new transaction data. Source adapters 262 can be provided for each type of transaction data that may be processed to identify request-response pair information that can be used to construct service models. The source adapters 262 can process particular types of transaction data by automatically opening or unpacking the data (e.g., unzipping, decrypting, and other tasks), parsing the transaction data to identify the information describing request-response pairs, and normalizing (in some cases) the data for consumption by an automation engine 218 and later a service model generator, among other example tasks. The automation engine 218 can monitor data sources 240 for new transaction data that includes request-response pair information. The automation engine 218 can utilize results of the source adapter processing 262 to determine that new or modified data is present within a data source that is relevant to the generation or modification of a corresponding service model. The automation engine 218 can further automatically identify, from the transaction data, attributes of the virtual service that is to result, such as the technology (e.g., Java Bean, SOAP, XML, etc.). The automation engine 218 can provide this information to other components of a virtual service system, such as the service model generator and virtual service engine, to automate the generation of a service model modeling requests and responses involving a particular component in various transactions and automate the launching of a virtual service from the service model. The launched virtual service can be provided within a virtual service environment 505 that can then serve as a stand-in for a real world software component modeled by the generated service model.

Figure 6:
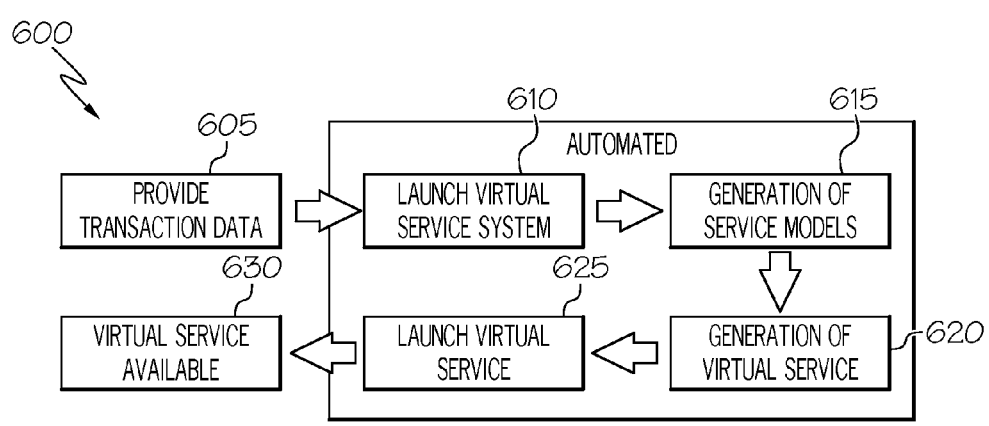
FIG. 6 is a simplified block diagram illustrating aspects of another example automatic generation and deployment of a virtual service in accordance with at least one embodiment.

Turning to FIG. 6, another simplified block diagram 600 is shown illustrating automation of various tasks within development of a virtual service using a virtual service system. In some implementations, a user may perform each of tasks 605, 610, 615, 620, 625, 630 manually in that the user interacts with corresponding user interfaces of the virtual service environment system to define and administer each aspect and step in the development of a virtual service. Such a hands-on approach may not always be appropriate or optimal, particularly for organizations who seek to utilize virtual services but lack the expertise or confidence to navigate the "manual" building of a virtual service. In this particular example, the only steps to be performed by a person, system, or organization seeking to generate and launch a virtual service is the preparation and provision of transaction data 605. The transaction data can be prepared through a variety of ways, including through user definition of request-response pairs in transactions involving a particular component to be modeled, monitoring actual transaction between the particular component and at least one other component, defining or extracting other structured or unstructured data that describes request-response behavior of the particular component, among other examples. The transaction data 605 can be provided to a data source that is accessible to the virtual service system and merely providing the transaction data 605 can, by itself, trigger and enable the automation of remaining steps 610, 615, 620, 625 to result in the launch of an available virtual service 630 based on the prepared transaction data 605. For instance, detection of provided transaction data 605 can cause the virtual service system to be launched 610 and service models to be generated or updated (615) based on request-response pairs identified in the provided transaction data 605. A virtual service can be generated 620 from the corresponding service model and the virtual service can be provisioned and launched 625 within a virtual service environment implemented using one or more virtual machines. To the user, in such examples, transaction data is provided 605 as an input and a virtual service is launched and made available 630 as a response to the provision of the transaction data without, in some cases, any further intervention on the part of the user (or system) providing the transaction data 605.

Figure 7:
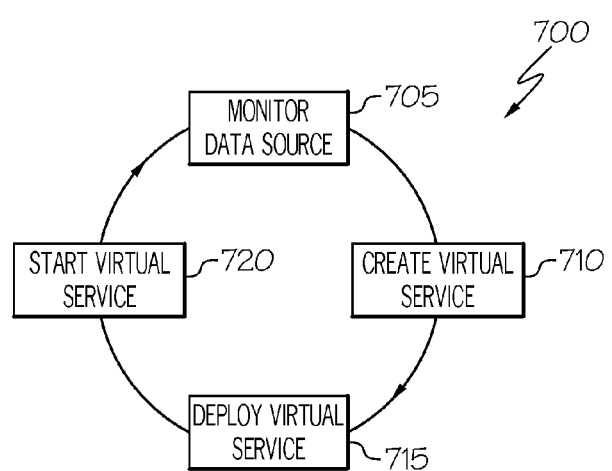
FIG. 7 is a simplified block diagram illustrating aspects of continuous generation and deployment of virtual services in accordance with at least one embodiment.

In the example of FIG. 7, a simplified block diagram is shown illustrating that a virtual service can be continuously and automatically updated and redeployed, in some instances, using an automation engine of a virtual service system. Transaction data describing request-response pairs can be used to generate a service model from which a virtual service can be created. As additional or otherwise modified transaction data corresponding to the component (and transactions) modeled by the service model are detected 705 (e.g., by an automation engine), the underlying service model can be automatically and dynamically modified to incorporate the information included in the new, changed, or otherwise modified transaction data. Further, a virtual service can be created 710 based on the updates to the service model and the virtual service can be deployed 715 and started 720, all in response to the detected modification to the transaction data. A data source identified as corresponding to the service model (and virtual service) can continue to be monitored 705. As modifications are detected, the service model and virtual service can be re-created to account for new information, such as new request-response pairs, included in the modified transaction data. The virtual service can be re-deployed with the modified virtual service, with the cycle continuing as additional changes are made to the underlying transaction data. In some cases, transactions can be monitored involving a live version of the software component modeled by the service model and the transaction data generated from the monitoring can be input to the monitored data source to cause the corresponding virtual service to be continuously, and dynamically, updated and re-launched to account for the evolving knowledge gleaned from the monitoring, among other examples.

Figure 8:
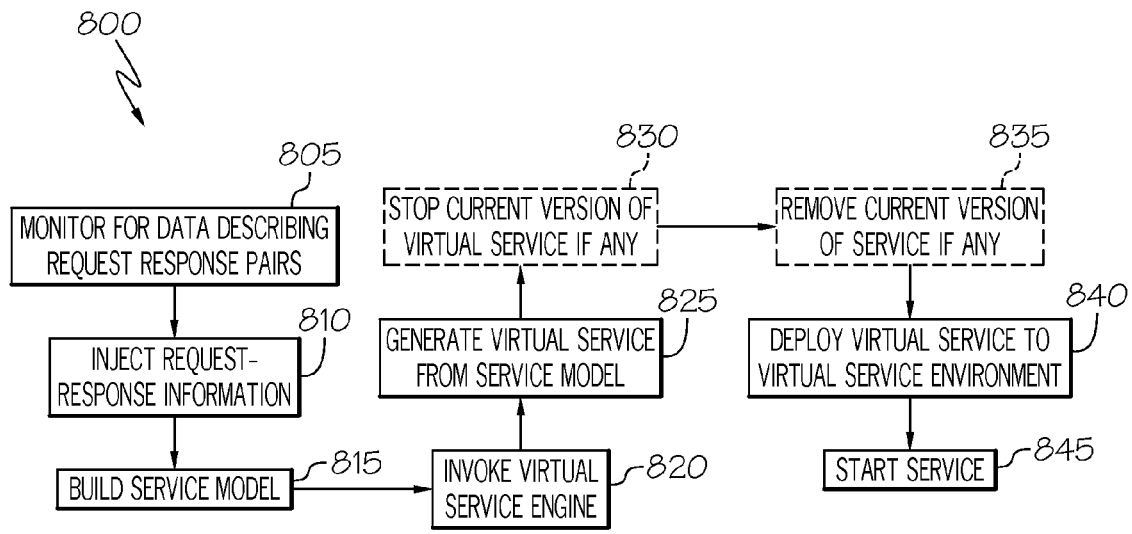
FIG. 8 is a simplified flowchart illustrating an example automatic generation and deployment of a virtual service in accordance with at least one embodiment.

FIG. 8 is a flowchart showing an example flow 800 in an example automatic generation and launch of a virtual service. A data source, such as a directory or inbox associated with an account of an entity providing the transaction data and utilizing the resulting virtual services, can be designated as a source of transaction data for a particular service model and can be monitored 805 for new transaction data. As transaction data is detected during the monitoring 805, request-response information 810 can be identified from the transaction data and injected with other information upon which a particular service model is constructed. The service model can be built or updated (815) based on the new request-response information and a virtual service engine can be invoked 820 to generate 825 and launch 840 a virtual service from the updated service model in a virtual service environment. As noted in connection with the example of FIG. 7, in some cases, a previous version of a virtual service for a corresponding modeled software component, generated from a previous version of the corresponding service model, may already have been launched and exist. In such cases, the current version of the virtual service can be stopped 830 and deconstructed (835) such that the virtual machine or other environment hosting the virtual service can be provisioned with the updated virtual service that replaces the current (now, previous) version of the virtual service. The virtual service, when deployed 840, can be fully prepared to be started 845 and used by the entity requesting the virtual service.

Figure 9:
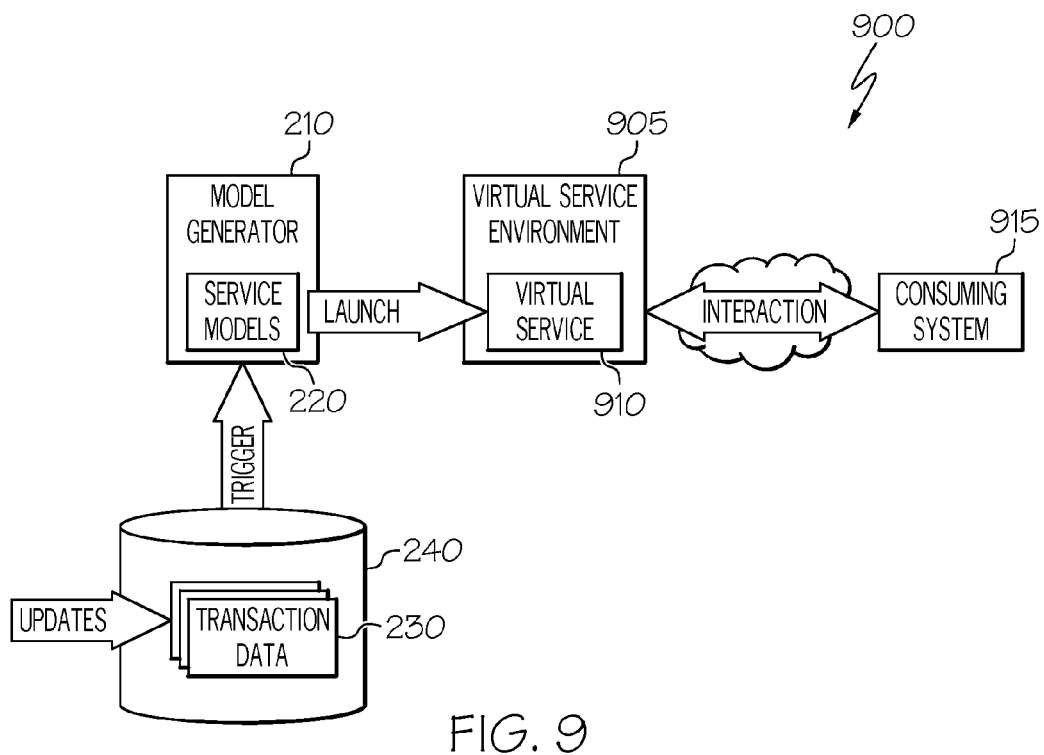
FIG. 9 is a simplified block diagram illustrating example functionality of a virtual service system in accordance with at least one embodiment.

FIG. 9 is simplified block diagram 900 illustrating example interactions of components of a virtual service system in the automated generation and launch of a virtual service from transaction data. Transaction data 230 can be provided to a data source 240 designated as a source for the generation of one or more particular service models. An automation engine can detect the update to the transaction data 230 and trigger generation or modification of a service model 220 by model generator 210 in response to the detection of the modified transaction data 230. A virtual service 910 can be launched in a virtual service environment 905 based on the service model 220. With the virtual service 910 provisioned within the virtual service environment 905, the virtual service 910 can start and interact with one or more components of a consuming system 915. For instance, virtual service 910 can start in response to a first one a set of requests being sent to the virtual service 910 from the consuming system 915. The virtual service 910 can generate synthesized responses to the requests to simulate one or more components modeled by the service model that may not be presently available for use with the consuming system 915, among other examples.

Figure 10A:
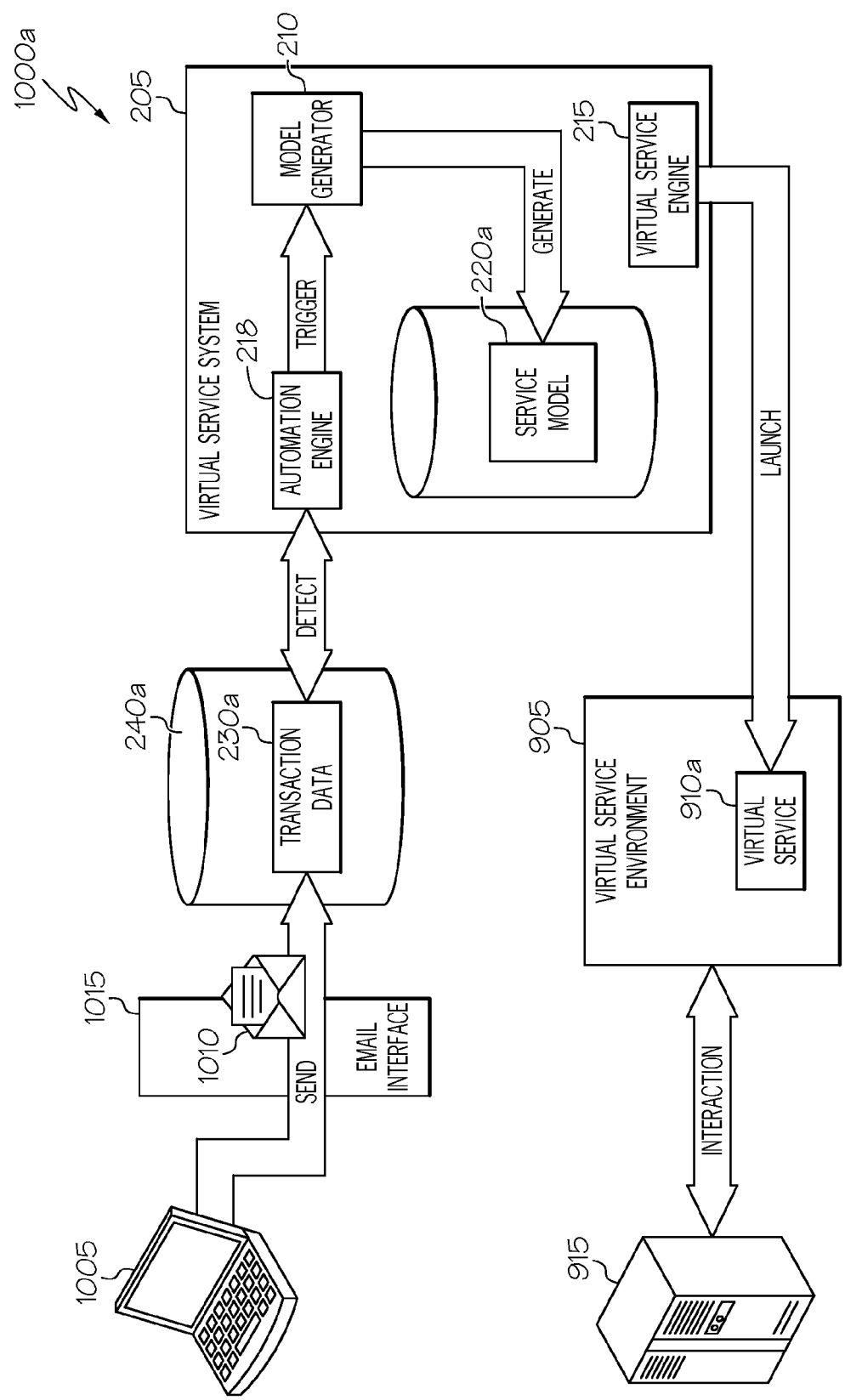

In some implementations, a virtual service system 205 can be made available as a remote or cloud-based service to multiple customers in that functionality for generating and launching virtual services is served remote from the organization using the service. A variety of use cases can utilize such an architecture. Additionally, the generation of virtual services can be automated in response to a variety of different inputs. In one example, illustrated in the simplified block diagram 1000a of FIG. 10A, one or more email inboxes can be provided for accepting transaction data that is to be used in the generation of a virtual service. A particular inbox data source 240a can be designated as corresponding to a virtual service that is to model a particular software component. The inbox 240a can be monitored by an automation engine 218 of a virtual service system 205. A user (e.g., using user device 1005) or system can upload transaction data 230a including information describing one or more request-response pairs through an email 1010 sent through an email interface 1015 to inbox 240a. The email 1010 can include the transaction data 230a as an attachment, such as a zip file including one or more transaction data files. Source adapters of the virtual service system can process the email to access and open the attachment, extract transaction data 230, and process transaction data 230 to identify request-response pair information contained in the transaction data 230a. The request-response pair information can be identified and trigger generation of service model 220a by model generator 210. Virtual service engine 215 can also be invoked in response to the email 1010 and corresponding generation of service model 220a to build the virtual service 910a from the service model 220a. Attributes of the virtual service 910a can be identified from transaction data 230a, such as the technology to be emulated by the virtual service, the type of virtual service (e.g., whether the virtual service is implemented using one or more agents), transport connection details of the transactions to be virtualized (e.g., hostname, port, queue names, class names, etc.), data format details for use in normalizing the data (e.g., SOAP structure, XML elements, copybook format, etc.), response time characteristics (e.g., delays, change of delays over time, etc.), integration of meta-data from external systems (e.g., integration of performance response time data from an application performance management system, among other examples), and desensitization of data contained in the responses, among other examples. The virtual service engine 215 can provision or deploy the virtual service 910a within a virtual service environment and the virtual service 910a can be started to interact with a consuming system 915, all in response to the sending of email 1010, in some implementations.

Figure 10B:
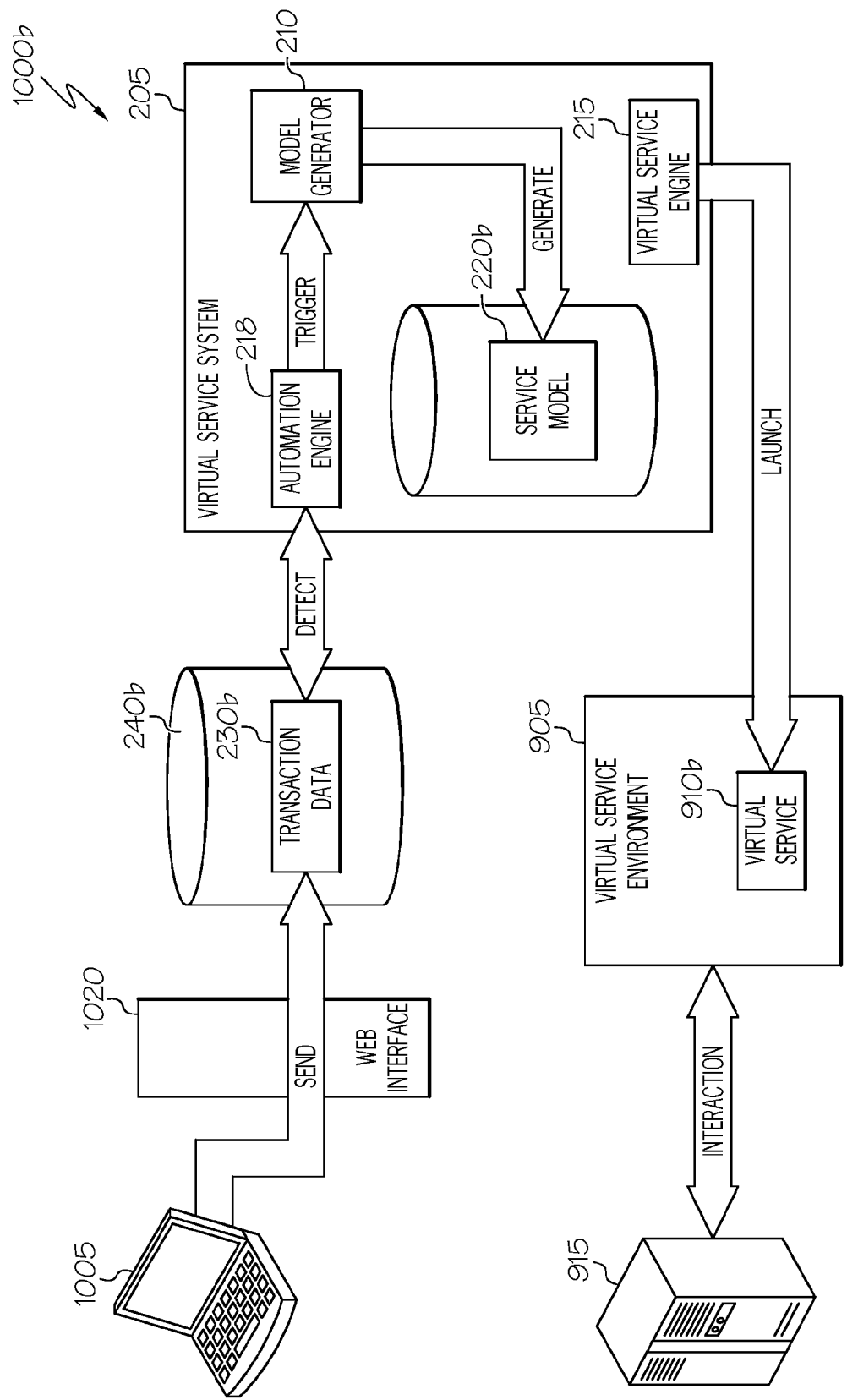

Turning to FIG. 10B, a simplified block diagram 1000b is shown illustrating another example implementation, utilizing a web interface 1020 through which a user (e.g., using user device 1005) or system can upload transaction data (e.g., 230b) to a directory or other data store 240b designated as associated with the modeling of one or more particular software components through a virtual service (e.g., 910b). Like the inbox 240a in the example of FIG. 10A, the directory 240b can be monitored by an automation engine 218 (or other logic of virtual service system 205) to detect modifications or additions to transaction data (e.g., 230b) upon which a service model 220b is to be built for use in generating virtual service 910b. As in other examples, a source adapter can process transaction data 230b received through the web interface 1020 to identify request-response information that can be used in the generation of service model 220b. Further, in some implementations, uploading the transaction data over web interface 1020 to director 240b can trigger the automatic generation/updating of service model 220b and the generation and launching of virtual service 910b, all without further intervention or instructions of the user or system that is effectively requesting the virtual service 910b through the provision of transaction data 230b.

Figure 10C:
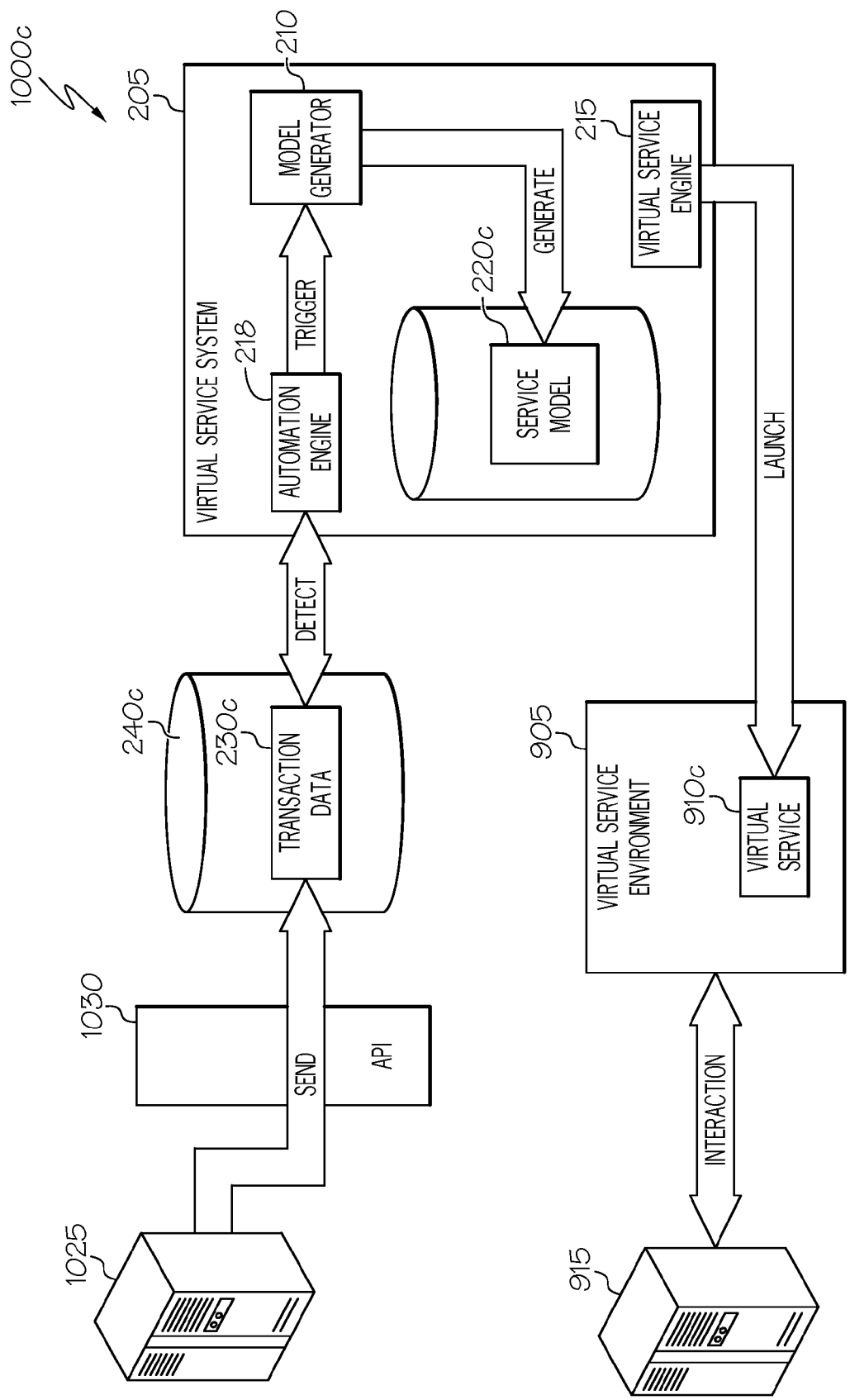

In yet another example, shown in the simplified block diagram 1000c of FIG. 10C, an API 1303 can be provided through which an application server 1025 or other system can interface with a data source 240c monitored by an automation engine 218 of a virtual service system 205. A system 1025 can send transaction data 230c to the data source 240c using API 1030. Detecting new request-response information in transaction data 230c can trigger the automatic generation of service model 220c and launch (e.g., generation and deployment) of a corresponding virtual service 910c. In the example of FIG. 10D, a simplified block diagram 1000d is shown of a monitoring component 1030, such as a connection monitor or instrumentation agent, that monitors requests and responses in transaction between two or more components, such as a first component hosted on system 1035 and a second component hosted on system 1040. One of systems 1035, 1040 can host the software component(s) that is to be simulated using the resulting virtual service 910d. Transaction data 230d generated by the monitor 1030 can be streamed, copied, forwarded, or otherwise sent to a data source 240d that is designated as a source of transaction data for a particular service model and virtual services launched from the service model. Like other data sources, an authentication engine 218 can monitor data source 240d and automatically cause service model 220d to be updated and a new version of virtual service 910d to be launched as new transaction data 230d is generated from the monitoring of monitor 1030.

It should be noted that a virtual service system (e.g., 205) can support and monitor multiple different types of data sources (e.g., 240a-d), provide multiple different interfaces through which transaction data can be conveniently supplied to data sources monitored by an automation engine (e.g., 218), and generate service models from multiple different types of transaction data. For instance, a single virtual service system can concurrently enable each of the examples and features of FIGS. 10A-10D. Additionally, a model generator 210 can utilize request-response information obtained from multiple different types of transaction data (e.g., 230*a-d*), from multiple different data sources (e.g., 240*a-d*), and/or through multiple different interfaces (e.g., 1015, 1020, 1030). Further, while in some instances, a service model and corresponding virtual service can be generated substantially immediately in response to detected modifications to transaction data, in some implementations, updating a service model or launching a corresponding virtual service from detected modifications to transaction data can be periodic, scheduled, or according to predefined triggers, among other examples.

Figure 11:
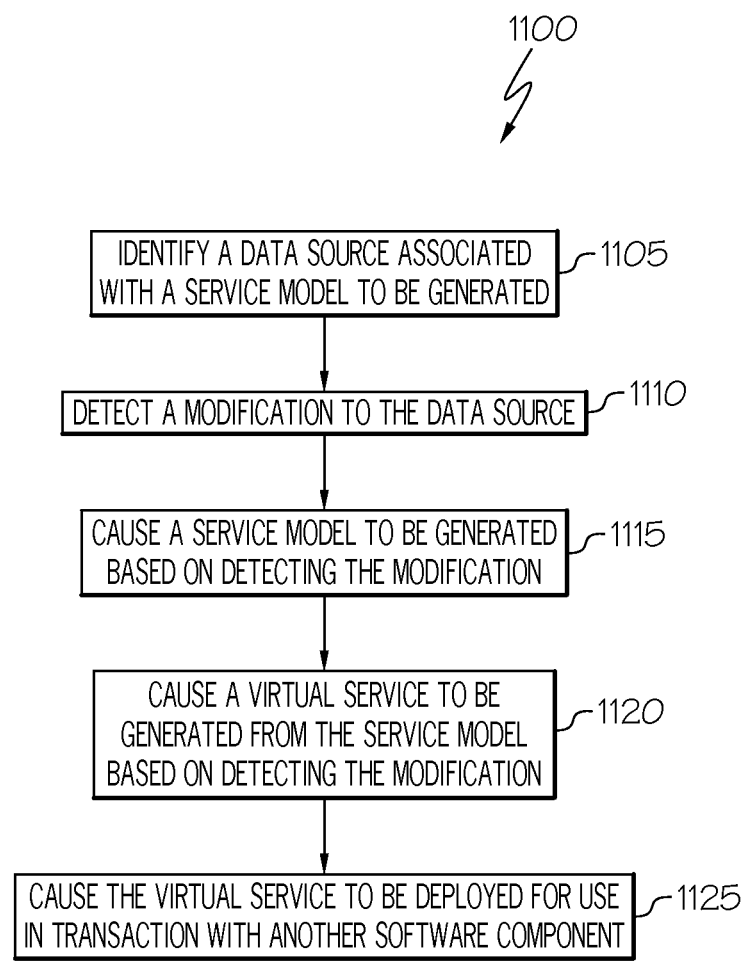
FIG. 11 is a simplified flowchart illustrating example techniques in connection with automatic generation and launch of a virtual service in accordance with at least one embodiment.

Turning to FIG. 11, simplified flowcharts 1100 is presented illustrating example techniques involved in automatically generating and launching a virtual service. For instance, a data source can be identified 1105 that is associated with a service model to be generated from transaction data provided to the data source. In some examples, the data source can be associated with a user account and a user can designate that the particular data source is associated with a particular virtualization activity. A modification to transaction data within the data source can be detected 1110. The modification can include, for instance, a change to a particular file that includes transaction data already within the data source, addition of a new transaction data to the data source, among potentially other examples. A service model that models responses of one or more particular software components to various requests within one or more types of transactions can be automatically generated based on, and in some cases in response to, detecting 1110 the modification to the transaction data. The service model can be generated 1115 from the transaction data. A virtual service can also be generated 1120 based on detecting 1110 the modification to the transaction data. The virtual service (e.g., the logic used to provide the virtual service based on the generated service model) can be prepared or otherwise generated based on the service model. The generated virtual service can be deployed 1125, for instance in a virtual machine or other virtual service environment, based on detecting 1110 the modification to the transaction data. Upon starting the deployed virtual service, another component can send requests to the virtual service as if the virtual service were the particular software component and the virtual service can simulate responses of the particular software component based on the received requests, among other examples.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
    identifying a data source, wherein the data source includes transaction data describing a plurality of transactions involving a particular software component and each transaction in the plurality of transactions comprises a respective request and a corresponding response to the request;
    monitoring the data source for modifications to the transaction data;
    detecting a modification to the transaction data;
    generating a service model to be automatically generated in response to detecting the modification, wherein the service model is to model responses of the particular software component to requests in transactions based at least in part on the modified transaction data; and
    generating a virtual service to be generated based on the service model, wherein the virtual service is configured to receive requests and generate virtual responses to the requests based on the service model to simulate responses of the particular software component.

2. The method of claim 1, wherein the modification is one of an addition of new transaction data and a change to existing transaction data in the data source.

3. The method of claim 1, wherein the modification comprises new transaction data added to the data source.

4. The method of claim 3, wherein the new transaction data is sent to the data source via an email and the data source comprises an email inbox.

5. The method of claim 3, wherein the new transaction data is sent to the data source via a web interface and the data source comprises a directory.

6. The method of claim 1, wherein the transaction data is generated from monitoring actual transactions involving the particular component.

7. The method of claim 1, further comprising processing the transaction data to extract information describing request-response pairs in the set of transactions.

8. The method of claim 1, wherein the service model is generated to model the requests and responses of the set of transactions.

9. The method of claim 1, wherein generating the service model comprises one of modifying an existing service model and generating a new service model from the transaction data.

10. The method of claim 1, further comprising deploying the virtual service in a virtual service environment.

11. The method of claim 10, wherein the virtual service comprises an updated version and deploying the virtual service comprises stopping a previous version of the virtual service and deploying the updated version.

12. The method of claim 10, further comprising sending a notification that the virtual service has been deployed.

13. The method of claim 1, wherein the service model and virtual service are to be generated automatically in response to user modification of transaction data in the data source.

14. The method of claim 1, further comprising identifying a port to be used during deployment of the virtual service from the transaction data.

15. The method of claim 1, further comprising identifying a technology to be emulated by the virtual service from the transaction data.

16. A computer program product comprising a computer readable storage medium comprising computer readable program code embodied therewith, the computer readable program code comprising:
   computer readable program code configured to identify transaction data describing a plurality of transactions involving a particular software component and each transaction in the plurality of transactions comprises a respective request and a corresponding response to the request;
   computer readable program code configured to monitor the data source for modifications to the transaction data;
   computer readable program code configured to identify a trigger corresponding to modifications to the transaction data identified during monitoring of the data source, wherein the trigger is for automatically generating, without further intervention of a user, a service model and a virtual service based on the set of transactions described in a modified version of the transaction data;
   computer readable program code configured to generate the service model in response to identification of the trigger, wherein the service model is to model responses of the particular software component to requests in transactions based at least in part on the transaction data;
   computer readable program code configured to determine, from the modified version of the transaction data, one or more attributes of the virtual service to be generated based on the service model; and
   computer readable program code configured to cause a virtual service to be generated based on the service model, wherein the virtual service is configured to receive requests and generate virtual responses to the requests based on the service model to simulate responses of the particular software component.

17. A system comprising:
a data processing apparatus;
a memory element;
a virtual service automation engine to:
   identify a data source, wherein the data source includes transaction data describing a plurality of transactions involving a particular software component and each transaction in the plurality of transactions comprises a respective request and a corresponding response to the request;
   monitor the data source for modifications to the transaction data;
   detect a modification to the transaction data;
   generate a service model to be automatically generated in response to detecting the modification, wherein the service model is to model responses of the particular software component to requests in transactions based at least in part on the modified transaction data; and
   generate a virtual service to be generated based on the service model, wherein the virtual service is configured to receive requests and generate virtual responses to the requests based on the service model to simulate responses of the particular software component.

18. The system of claim 17, further comprising a service model generator to generate the service model.

19. The system of claim 17, further comprising a virtual service engine to generate the virtual service and deploy the virtual service.

* * * * *